United States Patent
Haque et al.

(10) Patent No.: US 10,110,890 B2
(45) Date of Patent: Oct. 23, 2018

(54) VIDEO CODING SYSTEM WITH LOW DELAY AND METHOD OF OPERATION THEREOF

(71) Applicant: Sony Corporation, Tokyo (JP)

(72) Inventors: Munsi Haque, San Jose, CA (US); Kazushi Sato, Yokohama Kanagawa (JP); Ali Tabatabai, Cupertino, CA (US); Teruhiko Suzuki, Yokohama (JP)

(73) Assignee: SONY CORPORATION, Tokyo (JP)

( * ) Notice: Subject to any disclaimer, the term of this patent is extended or adjusted under 35 U.S.C. 154(b) by 361 days.

(21) Appl. No.: 13/757,685

(22) Filed: Feb. 1, 2013

(65) Prior Publication Data

US 2014/0003535 A1 Jan. 2, 2014

Related U.S. Application Data

(60) Provisional application No. 61/667,294, filed on Jul. 2, 2012, provisional application No. 61/677,349, filed on Jul. 30, 2012.

(51) Int. Cl.
*H04N 19/44* (2014.01)
*H04N 19/00* (2014.01)
(Continued)

(52) U.S. Cl.
CPC .......... *H04N 19/00* (2013.01); *H04N 19/146* (2014.11); *H04N 19/187* (2014.11);
(Continued)

(58) Field of Classification Search
None
See application file for complete search history.

(56) References Cited

U.S. PATENT DOCUMENTS

2003/0128757 A1* 7/2003 Dufour .............. H04N 19/20
375/240.08
2004/0005007 A1 1/2004 Viscito et al.
(Continued)

FOREIGN PATENT DOCUMENTS

CN 101578867 A 11/2009
CN 101663893 A 3/2010
(Continued)

OTHER PUBLICATIONS

International Search Report for PCT Application No. PCT/US2013/048890 dated Sep. 6, 2013.
(Continued)

*Primary Examiner* — William C Vaughn, Jr.
*Assistant Examiner* — Jerry Jean Baptiste
(74) *Attorney, Agent, or Firm* — Chip Law Group

(57) ABSTRACT

A method of operation of a video coding system includes: receiving a video bitstream as a serial bitstream; extracting a video syntax from the video bitstream; extracting a low delay flag, a network abstraction layer (NAL) hypothetical reference decode (HRD) parameters present flag, and a video coding layer (VCL) HRD parameters present flag from the video syntax extracting a HRD syntax from the video bitstream based on the low delay flag, the NAL HRD parameters present flag, and the VCL HRD parameters present flag; extracting a temporal layer from the video bitstream based on the video syntax having the HRD syntax; and forming a video stream based on the temporal layer for displaying on a device.

6 Claims, 9 Drawing Sheets

| | Desc. |
|---|---|
| hrd_parameters( ) { | |
|   cpb_cnt_minus1 | ue(v) |
|   bit_rate_scale | u(4) |
|   cpb_size_scale | u(4) |
|   for( SchedSelIdx = 0; SchedSelIdx <= cpb_cnt_minus1; SchedSelIdx++ ) { | |
|     bit_rate_value_minus1[ SchedSelIdx ] | ue(v) |
|     cpb_size_value_minus1[ SchedSelIdx ] | ue(v) |
|     cbr_flag[ SchedSelIdx ] | u(1) |
|   } | |
|   initial_cpb_removal_delay_length_minus1 | u(5) |
|   cpb_removal_delay_length_minus1 | u(5) |
|   dpb_output_delay_length_minus1 | u(5) |
|   time_offset_length | u(5) |
| } | |

(51) Int. Cl.
*H04N 19/70* (2014.01)
*H04N 19/31* (2014.01)
*H04N 19/146* (2014.01)
*H04N 19/187* (2014.01)
*H04N 19/169* (2014.01)

(52) U.S. Cl.
CPC ........... *H04N 19/188* (2014.11); *H04N 19/31* (2014.11); *H04N 19/44* (2014.11); *H04N 19/70* (2014.11)

(56) References Cited

U.S. PATENT DOCUMENTS

| | | | |
|---|---|---|---|
| 2004/0190606 | A1 | 9/2004 | Deshpande |
| 2005/0254575 | A1* | 11/2005 | Hannuksela ........... H04N 19/70 375/240.1 |
| 2006/0120463 | A1* | 6/2006 | Wang ................. H04N 19/134 375/240.25 |
| 2009/0066858 | A1* | 3/2009 | Turner et al. .................. 348/744 |
| 2010/0086034 | A1 | 4/2010 | Park et al. |
| 2010/0091837 | A1* | 4/2010 | Zhu ....................... H04N 19/70 375/240.01 |
| 2010/0091841 | A1 | 4/2010 | Ishtiaq et al. |
| 2010/0091882 | A1* | 4/2010 | Luo ..................... H04N 19/597 375/240.25 |
| 2010/0098154 | A1 | 4/2010 | Lou et al. |
| 2010/0142613 | A1 | 6/2010 | Zhu |
| 2010/0195738 | A1* | 8/2010 | Zhu et al. ................ 375/240.25 |
| 2010/0232520 | A1 | 9/2010 | Wu et al. |
| 2011/0038424 | A1 | 2/2011 | Luo et al. |
| 2011/0043701 | A1 | 2/2011 | Kurita et al. |
| 2011/0058613 | A1 | 3/2011 | Han et al. |
| 2011/0280316 | A1 | 11/2011 | Chen et al. |
| 2012/0133736 | A1 | 5/2012 | Nishi et al. |
| 2012/0170646 | A1 | 7/2012 | Baylon et al. |
| 2012/0183076 | A1 | 7/2012 | Boyce et al. |
| 2012/0183077 | A1 | 7/2012 | Hong et al. |
| 2012/0229602 | A1 | 9/2012 | Chen et al. |
| 2012/0230397 | A1 | 9/2012 | Ouedraogo et al. |
| 2012/0230431 | A1 | 9/2012 | Boyce et al. |
| 2013/0113882 | A1 | 5/2013 | Haque et al. |
| 2013/0191550 | A1* | 7/2013 | Hannuksela ................. 709/231 |
| 2014/0016697 | A1* | 1/2014 | Wang ..................... H04N 19/50 375/240.12 |
| 2014/0022343 | A1* | 1/2014 | Chen .............................. 348/43 |
| 2014/0098896 | A1* | 4/2014 | Wang ..................... H04N 19/70 375/240.26 |

FOREIGN PATENT DOCUMENTS

| | | |
|---|---|---|
| CN | 102238392 A | 11/2011 |
| JP | 2010-525661 A | 7/2010 |
| WO | 2008085433 A2 | 7/2008 |
| WO | 2008128388 A1 | 10/2008 |
| WO | 2008130500 A2 | 10/2008 |
| WO | 2012010928 A1 | 1/2012 |

OTHER PUBLICATIONS

International Search Report for PCT Application No. PCT/US2013/048902 dated Sep. 4, 2013.
International Search Report for PCT Application No. PCT/US2013/048925 dated Sep. 13, 2013.
U.S. Appl. No. 13/757,624, filed Feb. 1, 2013, Haque et al.
U.S. Appl. No. 13/757,679, filed Feb. 1, 2013, Haque et al.
Bross et al., High efficiency video coding (HEVC) text specification draft 7, JCTVC-I1003 d4, Apr. 2012, Publisher: Joint Collaborative Team on Video Coding (JCT-VC) of ITU-T SG16 WP3 and ISO/IEC JTC1/SC29/WG11, Published in: Geneva, CH.
Bross et al., High-Efficiency Video Coding (HEVC) text specification draft 8, Jul. 11-20, 2012, pp. 1-260, Publisher: Joint Collaborative Team on Video Coding (JCT-VC) of ITU-T SG16 WP3 and ISO/IEC JTC1/SC29/WG11, Published in: Stockholm, Sweden.
Haque et al., HEVC VUI Parameters with Extension Hooks, Jul. 10-20, 2012, pp. 1-7, Publisher: Joint Collaborative Team on Video Coding (JCT-VC) of ITU-T SG 16 WP 3 and ISO/IEC JTC 1/SC 29/WG 11, Published in: Stockholm, Sweden.
Haque et al., A simple ordering issue for VUI parameters syntax, Jul. 11-20, 2012, pp. 1-3, Publisher: Joint Collaborative Team on Video Coding (JCT-VC) of ITU-T SG 16 WP 3 and ISO/IEC JTC 1/SC 29/WG 11, Published in: Stockholm, Sweden.
Haque et al., Extension of HEVC VUI Syntax Structure, JVTVC-I0263, Apr. 2012, pp. 1-5, Publisher: Joint Collaborative Team on Video Coding (JCT-VC) f ITU-T SG 16 WP 3 and ISO/IEC JTC 1/SC 29/WG 11, Published in: Geneva, CH.
Haque et al., AHG10: VUI and HRD syntax designs agreed by the BoG on VPS and NUH, JCTVC-J0548rl, Jul. 2012, pp. 1-7, Publisher: Joint Collaborative Team on Video Coding (JCT-VC) of ITU-T SG 16 WP 3 and ISO/IEC JTC 1/SC 29/WG 11, Published in: Geneva, CH.
Sullivan et al., Overview of the High Efficiency Video Coding (HEVC) Standard, Pre-Publication Draft: IEEE Transactions on Circuit and Systems for Video Technology, Dec. 2012, pp. 1-19, Publisher: Institute of Electrical and Electronics Engineers.
Extended European Search Report for Application No. 13812715.4 dated Feb. 8, 2016.
Office Action for CN Patent Application No. 201380034972.6, dated Mar. 15, 2017,10 pages of Office Action and 18 pages of English Translation.
Extended European Search Report received for European Patent Application No. 13813661.9, dated Dec. 21, 2015, pp. 12.
Eric Viscito, "HRD Editor's Input to Final Committee Draft (FCD) of Joint Video Specification (ITU-T Rec. H.264 I ISO/IEC 14496-10 AVC) regarding Hypothetical Reference Decoder", Joint Video Team (JVT) of ISO/IEC MPEG and ITU-T VCEG, Draft ISO/IEC 14496-10 : 2002 (E), 4th Meeting: Klagenfurt, Austria, Jul. 22-26, 2002, pp. 18.
Narasimhan et al., "Change to conditional signaling of low_delay_hrd_flag in VUI", Joint Video Team (JVT) of ISO/IEC MPEG & ITU-T VCEG, ISO/I EC JTC1/SC29IWG11 and ITU-T SG16 Q.6, 20th Meeting: Klagenfurt, Jul. 2006, pp. 7.
Haque et al., "On VUI syntax parameters", Joint Collaborative Team on Video Coding (JCT-VC) of ITU-T SG16 WP3 and ISOIIEC JTCI/SC29/WG11 6th Meeting: Torino, IT, Jul. 14-22, 2011, pp. 4.
Extended European Search Report of EP Patent Application No. 13813661.9, dated Jul. 20, 2017, 07 pages.
Eric Viscito, "HRD Editor's Input to Final Committee Draft (FCD) of Joint Video Specification (ITU-T Rec. H.264I ISO/IEC 14496-10 AVC) regarding Hypothetical Reference Decoder", Joint Video Team (JVT) of ISO/IEC MPEG and ITU-T VCEG, JVT-D146, 4th Meeting: Klagenfurt, Austria, Jul. 22-26, 2002, 18 pages.
Ye-Kui Wang, "AHG 9: On fixed_pic_rate_flag", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, 5 pages.
Haque, et al., "AHG 10: VUI and HRD syntax designs agreed by the BoG on VPS and NUH", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, 7 pages.
Office Action for JP Patent Application No. 2016-207787, dated Sep. 26, 2017, 4 pages of Office Action and 3 pages of English Translation.
Office Action for JP Patent Application No. 2016-207787, dated Apr. 24, 2018, 5 pages of Office Action and 3 pages of English Translation.
Haque, et al, "AHG10: VUI and HRD Syntax Designs Agreed by the BoG on VPS and NUH", Joint Collaborative Team on Video Coding (JCT-VC) of ITU-T SG16 WP3 and ISO/IEC JTC1/SC29/WG11, JCTVC-J0548r1,10th meeting, Stockholm, SE, Jul. 11-20, 2012, 7 pages.
Ye-Kui Wang, "AHG9: On fixed_pic_rate_flag", Joint Collaborative Team on Video Coding (JCT-VC) of ITU-T SG16 WP3 and ISO/IEC JTC1/SC29/WG11, Document: JCTVC-J0570, 10th meeting, Stockholm, SE, Jul. 11-20, 2012, 5 pages.

(56) References Cited

OTHER PUBLICATIONS

Office Action for KR Patent Application No. 10-2016-7021990, dated Aug. 30, 2018, 04 pages of Office Action and 03 pages of English Translation.
Bross, et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, JCTVC-I1003_d0, Apr. 27-May 7, 2012, 270 pages.

* cited by examiner

| hrd_parameters( ) { | Desc. |
|---|---|
| cpb_cnt_minus1 | ue(v) |
| bit_rate_scale | u(4) |
| cpb_size_scale | u(4) |
| for( SchedSelIdx = 0; SchedSelIdx <= cpb_cnt_minus1; SchedSelIdx++ ) { | |
| bit_rate_value_minus1[ SchedSelIdx ] | ue(v) |
| cpb_size_value_minus1[ SchedSelIdx ] | ue(v) |
| cbr_flag[ SchedSelIdx ] | u(1) |
| } | |
| initial_cpb_removal_delay_length_minus1 | u(5) |
| cpb_removal_delay_length_minus1 | u(5) |
| dpb_output_delay_length_minus1 | u(5) |
| time_offset_length | u(5) |
| } | |

FIG. 3

| vui_parameters( ) { | Desc. |
|---|---|
| ... | |
| nal_hrd_parameters_present_flag | u(1) |
| vcl_hrd_parameters_present_flag | u(1) |
| if( nal_hrd_parameters_present_flag \|\| vcl_hrd_parameters_present_flag ) { | |
| low_delay_hrd_flag | u(1) |
| sub_pic_cpb_params_present_flag | u(1) |
| if( sub_pic_cpb_params_present_flag ) | |
| num_units_in_sub_tick | u(32) |
| } | |
| if( nal_hrd_parameters_present_flag ) | |
| hrd_parameters( ) | |
| if( vcl_hrd_parameters_present_flag ) | |
| hrd_parameters( ) | |
| ... | |
| } | |

FIG. 5

| 402 ↘ | | |
|---|---|---|
| 404 → | vui_parameters( ) { | Desc. |
| 406 → | aspect_ratio_info_present_flag | u(1) |
| | if( aspect_ratio_info_present_flag ) { | |
| 408 → | aspect_ratio_idc | u(8) |
| | if( aspect_ratio_idc = = Extended_SAR ) { | |
| 410 → | sar_width | u(16) |
| 412 → | sar_height } } | u(16) |
| 414 → | overscan_info_present_flag | u(1) |
| | if( overscan_info_present_flag ) | |
| 416 → | overscan_appropriate_flag | u(1) |
| 418 → | video_signal_type_present_flag | u(1) |
| | if( video_signal_type_present_flag ) { | |
| 420 → | video_format | u(3) |
| 422 → | video_full_range_flag | u(1) |
| 424 → | colour_description_present_flag | u(1) |
| | if( colour_description_present_flag ) { | |
| 426 → | colour_primaries | u(8) |
| 428 → | transfer_characteristics | u(8) |
| 430 → | matrix_coefficients } } | u(8) |
| 432 → | chroma_loc_info_present_flag | u(1) |
| | if( chroma_loc_info_present_flag ) { | |
| 434 → | chroma_sample_loc_type_top_field | ue(v) |
| 436 → | chroma_sample_loc_type_bottom_field } | ue(v) |
| 438 → | neutral_chroma_indication_flag | u(1) |
| 440 → | field_seq_flag | u(1) |
| 442 → | timing_info_present_flag | u(1) |
| | if( timing_info_present_flag ) { | |
| 444 → | num_units_in_tick | u(32) |
| 446 → | time_scale | u(32) |
| 448 → | fixed_pic_rate_flag } | u(1) |
| 452 → | nal_hrd_parameters_present_flag | u(1) |
| | if( nal_hrd_parameters_present_flag ) | |
| 454 → | hrd_parameters( ) | |
| 456 → | vcl_hrd_parameters_present_flag | u(1) |
| | if( vcl_hrd_parameters_present_flag ) | |
| | hrd_parameters( ) | |
| | if( nal_hrd_parameters_present_flag \|\| vcl_hrd_parameters_present_flag) { | |
| 460 → | low_delay_hrd_flag | u(1) |
| 462 → | sub_pic_cpb_params_present_flag | u(1) |
| | if( sub_pic_cpb_params_present_flag ) | |
| 464 → | num_units_in_sub_tick } | u(32) |
| 466 → | bitstream_restriction_flag | u(1) |
| | if( bitstream_restriction_flag ) { | |
| 468 → | tiles_fixed_structure_flag | u(1) |
| 470 → | motion_vectors_over_pic_boundaries_flag | u(1) |
| 472 → | max_bytes_per_pic_denom | ue(v) |
| 474 → | max_bits_per_mincu_denom | ue(v) |
| 476 → | log2_max_mv_length_horizontal | ue(v) |
| 478 → | log2_max_mv_length_vertical } } | ue(v) |

FIG. 4

| | hrd_parameters( commonInfPresentFlag, MaxNumSubLayersMinus1 ) { | Desc. |
|---|---|---|
| 604 → | if( commonInfPresentFlag ) { | |
| 442 → |   timing_info_present_flag | u(1) |
| |   if( timing_info_present_flag ) { | |
| 444 → |     num_units_in_tick | u(32) |
| 446 → |     time_scale | u(32) |
| |   } | |
| 452 → |   nal_hrd_parameters_present_flag | u(1) |
| 456 → |   vcl_hrd_parameters_present_flag | u(1) |
| |   if( nal_hrd_parameters_present_flag \|\| vcl_hrd_parameters_present_flag ){ | |
| 462 → |     sub_pic_cpb_params_present_flag | u(1) |
| |     if( sub_pic_cpb_params_present_flag ) | |
| 606 → |       tick_divisor_minus2 | u(8) |
| 310 → |     bit_rate_scale | u(4) |
| 312 → |     cpb_size_scale | u(4) |
| 322 → |     initial_cpb_removal_delay_length_minus1 | u(5) |
| 324 → |     cpb_removal_delay_length_minus1 | u(5) |
| 326 → |     dpb_output_delay_length_minus1 | u(5) |
| |   } | |
| | } | |
| 306 → | for( i = 0; i <= MaxNumSubLayersMinus1; i++ ) { | |
| 448 → |   fixed_pic_rate_flag[ i ] | u(1) |
| |   if( fixed_pic_rate_flag[ i ] ) | |
| 608 → |     pic_duration_in_tc_minus1[ i ] | ue(v) |
| 460 → |   low_delay_hrd_flag[ i ] | u(1) |
| 308 → |   cpb_cnt_minus1[ i ] | ue(v) |
| |   if( nal_hrd_parameters_present_flag ) | |
| 610 → |     hrd_parameters_sub_layer( i ) | |
| |   if( vcl_hrd_parameters_present_flag ) | |
| |     hrd_parameters_sub_layer( i ) | |
| | } | |
| | } | |

FIG. 6

| | hrd_parameters_sub_layer( tld ) { | Desc. |
|---|---|---|
| 704 → | for( SchedSelIdx = 0; SchedSelIdx <= cpb_cnt_minus1[ i ]; SchedSelIdx++ ) { | |
| 314 → | | |
| 316 → |   bit_rate_value_minus1[ SchedSelIdx ] | ue(v) |
| 318 → |   cpb_size_value_minus1[ SchedSelIdx ] | ue(v) |
| 320 → |   cbr_flag[ SchedSelIdx ] | u(1) |
| | } | |
| | } | |

FIG. 7

| | | |
|---|---|---|
| 802 | | |
| 804 → | vui_parameters( ) { | Desc. |
| 406 → | aspect_ratio_info_present_flag | u(1) |
| | if( aspect_ratio_info_present_flag ) { | |
| 408 → | aspect_ratio_idc | u(8) |
| | if( aspect_ratio_idc == Extended_SAR ) { | |
| 410 → | sar_width | u(16) |
| 412 → | sar_height } } | u(16) |
| 414 → | overscan_info_present_flag | u(1) |
| | if( overscan_info_present_flag ) | |
| 416 → | overscan_appropriate_flag | u(1) |
| 418 → | video_signal_type_present_flag | u(1) |
| | if( video_signal_type_present_flag ) { | |
| 420 → | video_format | u(3) |
| 422 → | video_full_range_flag | u(1) |
| 424 → | colour_description_present_flag | u(1) |
| | if( colour_description_present_flag ) { | |
| 426 → | colour_primaries | u(8) |
| 428 → | transfer_characteristics | u(8) |
| 430 → | matrix_coefficients } } | u(8) |
| 432 → | chroma_loc_info_present_flag | u(1) |
| | if( chroma_loc_info_present_flag ) { | |
| 434 → | chroma_sample_loc_type_top_field | ue(v) |
| 436 → | chroma_sample_loc_type_bottom_field } | ue(v) |
| 438 → | neutral_chroma_indication_flag | u(1) |
| 440 → | field_seq_flag | u(1) |
| 454 → | hrd_parameters( 1, sps_max_sub_layers_minus1 ) | |
| 466 → | bitstream_restriction_flag | u(1) |
| | if( bitstream_restriction_flag ) { | |
| 468 → | tiles_fixed_structure_flag | u(1) |
| 470 → | motion_vectors_over_pic_boundaries_flag | u(1) |
| 472 → | max_bytes_per_pic_denom | ue(v) |
| 474 → | max_bits_per_mincu_denom | ue(v) |
| 476 → | log2_max_mv_length_horizontal | ue(v) |
| 478 → | log2_max_mv_length_vertical } } | ue(v) |

FIG. 8

VIDEO CODING SYSTEM WITH LOW DELAY AND METHOD OF OPERATION THEREOF

CROSS-REFERENCE TO RELATED APPLICATION

The present application contains subject matter related to concurrently filed U.S. patent application Ser. No. 13/757,624. The related application is assigned to Sony Corporation and the subject matter thereof is incorporated herein by reference in its entirety.

The present application contains subject matter related to concurrently filed U.S. patent application Ser. No. 13/757,679. The related application is assigned to Sony Corporation and the subject matter thereof is incorporated herein by reference in its entirety.

The present application claims the benefit of U.S. Provisional Patent Application Ser. No. 61/667,294 filed Jul. 2, 2012 and U.S. Provisional Patent Application Ser. No. 61/677,349 filed Jul. 30, 2012 and the subject matter thereof is incorporated herein by reference in its entirety.

TECHNICAL FIELD

The present invention relates generally to video systems, and more particularly to a system for video coding with low delay.

BACKGROUND ART

The deployment of high quality video to smart phones, high definition televisions, automotive information systems, and other video devices with screens has grown tremendously in recent years. The wide variety of information devices supporting video content requires multiple types of video content to be provided to devices with different size, quality, and connectivity capabilities.

Video has evolved from two dimensional single view video to multiview video with high-resolution three dimensional imagery. In order to make the transfer of video more efficient, different video coding and compression schemes have tried to get the best picture from the least amount of data. The Moving Pictures Experts Group (MPEG) developed standards to allow good video quality based on a standardized data sequence and algorithm. The H.264 (MPEG4 Part 10)/Advanced Video Coding design was an improvement in coding efficiency typically by a factor of two over the prior MPEG-2 format. The quality of the video is dependent upon the manipulation and compression of the data in the video. The video can be modified to accommodate the varying bandwidths used to send the video to the display devices with different resolutions and feature sets. However, distributing larger, higher quality video, or more complex video functionality requires additional bandwidth and improved video compression.

Thus, a need still remains for a video coding system that can deliver good picture quality and features across a wide range of device with different sizes, resolutions, and connectivity. In view of the increasing demand for providing video on the growing spectrum of intelligent devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a method of operation of a video coding system including: receiving a video bitstream as a serial bitstream; extracting a video syntax from the video bitstream; extracting a low delay flag, a network abstraction layer (NAL) hypothetical reference decode (HRD) parameters present flag, and a video coding layer (VCL) HRD parameters present flag from the video syntax extracting a HRD syntax from the video bitstream based on the low delay flag, the NAL HRD parameters present flag, and the VCL HRD parameters present flag; extracting a temporal layer from the video bitstream based on the video syntax having the HRD syntax; and forming a video stream based on the temporal layer for displaying on a device.

The present invention provides a video coding system, including: a receive module for receiving a video bitstream as a serial bitstream; a get syntax module, coupled to the receive module, for extracting a video syntax from the video bitstream, extracting a low delay flag and a network abstraction layer (NAL) hypothetical reference decode (HRD) parameters present flag and a video coding layer (VCL) HRD parameters present flag from the video syntax, and extracting a HRD syntax from the video bitstream based on the low delay flag, the NAL HRD parameters present flag, and the VCL HRD parameters present flag; a decode module, coupled to the get syntax module, for extracting a temporal layer from the video bitstream based on the video syntax having the HRD syntax; and a display module, coupled to the decode module, for forming a video stream based on the temporal layer for displaying on a device.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 3 is an example of a HRD syntax.

FIG. 4 is an example of a High Efficiency Video Coding (HEVC) Video Usability Information (VUI) syntax.

FIG. 5 is an example of a HEVC VUI extension syntax.

FIG. 6 is an example of a HRD base syntax.

FIG. 7 is an example of a HRD sub-layer syntax.

FIG. 8 is an example of a HRD VUI syntax.

BEST MODE FOR CARRYING OUT THE INVENTION

Figure 1:
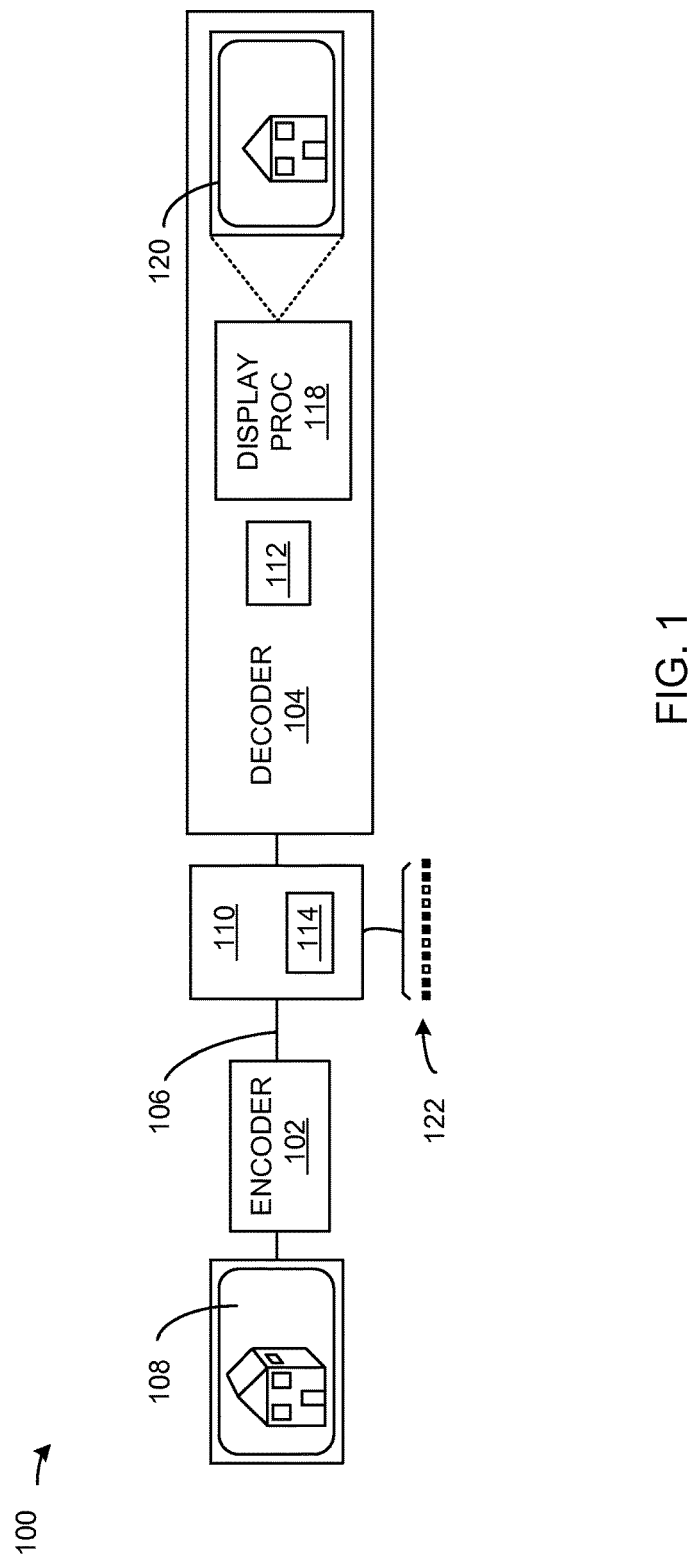
FIG. 1 is a block diagram of a video coding system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

The term "syntax" means the set of elements describing a data structure. The term "module" referred to herein can include software, hardware, or a combination thereof in the present invention in accordance with the context used.

Referring now to FIG. 1, therein is shown a block diagram of a video coding system 100 in an embodiment of the present invention. A video encoder 102 can receive a video content 108 and send a video bitstream 110 to a video decoder 104 for decoding and display on a display interface 120.

The video encoder 102 can receive and encode the video content 108. The video encoder 102 is a unit for encoding the video content 108 into a different form. The video content 108 is defined as a digital representation of a scene of objects. For example, the video content 108 can be the digital output of one or more digital video cameras.

Encoding is defined as computationally modifying the video content 108 to a different form. For example, encoding can compress the video content 108 into the video bitstream 110 to reduce the amount of data needed to transmit the video bitstream 110.

In another example, the video content 108 can be encoded by being compressed, visually enhanced, separated into one or more views, changed in resolution, changed in aspect ratio, or a combination thereof. In another illustrative example, the video content 108 can be encoded according to the High-Efficiency Video Coding (HEVC)/H.265 standard.

The video encoder 102 can encode the video content 108 to form the video bitstream 110. The video bitstream 110 is defined a sequence of bits representing information associated with the video content 108. For example, the video bitstream 110 can be a bit sequence representing a compression of the video content 108.

In another example, the video bitstream 110 can be a serial bitstream 122. The serial bitstream 122 is a series of bits representing the video content 108 where each bit is transmitted serially over time.

The video encoder 102 can receive the video content 108 for a scene in a variety of ways. For example, the video content 108 representing objects in the real-world can be captured with a video camera, multiple cameras, generated with a computer, provided as a file, or a combination thereof.

The video content 108 can include a variety of video features. For example, the video content 108 can include single view video, multiview video, stereoscopic video, or a combination thereof. In a further example, the video content 108 can be multiview video of four or more cameras for supporting three-dimensional (3D) video viewing without 3D glasses.

The video encoder 102 can encode the video content 108 using a video syntax 114 to generate the video bitstream 110. The video syntax 114 is defined as a set of information elements that describe a coding system for encoding and decoding the video content 108. The video bitstream 110 is compliant with the video syntax 114, such as High-Efficiency Video Coding/H.265, and can include a HEVC video bitstream, an Ultra High Definition video bitstream, or a combination thereof. The video bitstream 110 can include the video syntax 114.

The video bitstream 110 can include information representing the imagery of the video content 108 and the associated control information related to the encoding of the video content 108. For example, the video bitstream 110 can include an occurrence of the video syntax 114 and an occurrence of the video content 108.

The video coding system 100 can include the video decoder 104 for decoding the video bitstream 110. The video decoder 104 is defined as a unit for receiving the video bitstream 110 and modifying the video bitstream 110 to form a video stream 112.

The video decoder 104 can decode the video bitstream 110 to form the video stream 112 using the video syntax 114. Decoding is defined as computationally modifying the video bitstream 110 to form the video stream 112. For example, decoding can decompress the video bitstream 110 to form the video stream 112 formatted for displaying on the display the display interface 120.

The video stream 112 is defined as a computationally modified version of the video content 108. For example, the video stream 112 can include a modified occurrence of the video content 108 with different resolution. The video stream 112 can include cropped decoded pictures from the video content 108.

In a further example, the video stream 112 can have a different aspect ratio, a different frame rate, different stereoscopic views, different view order, or a combination thereof than the video content 108. The video stream 112 can have different visual properties including different color parameters, color planes, contrast, hue, or a combination thereof.

The video coding system 100 can include a display processor 118. The display processor 118 can receive the video stream 112 from the video decoder 104 for display on the display interface 120. The display interface 120 is a unit that can present a visual representation of the video stream 112.

For example, the display interface 120 can include a smart phone display, a digital projector, a DVD player display, or a combination thereof. Although the video coding system 100 shows the video decoder 104, the display processor 118, and the display interface 120 as individual units, it is understood that the video decoder 104 can include the display processor 118 and the display interface 120.

The video encoder 102 can send the video bitstream 110 to the video decoder 104 over a communication path 106. The communication path 106 can be a variety of networks suitable for data transfer.

In an illustrative example, the video coding system 100 can include coded picture buffers (not shown). The coded picture buffers can act as first-in first-out buffers containing access units, where each access unit can contain one frame of the video bitstream 110.

In another illustrative example, the video coding system 100 can include a hypothetical reference decoder (not shown). The hypothetical reference decoder can be a decoder model used to constrain the variability of the video bitstream 110.

For example, the communication path 106 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

The video coding system 100 can employ a variety of video coding syntax structures. For example, the video coding system 100 can encode and decode video information using High Efficiency Video Coding/H.265. The video coding syntaxes are described in the following documents that are incorporated by reference in their entirety:

B. Bross, W. Han, J Ohm, G. Sullivan, T. Wiegand, "High-Efficiency Video Coding (HEVC) text specification draft 8", JCTVC-J1003 d7, July 2012 (Stockholm).

B. Bross, W. Han, J. Ohm, G. Sullivan, T. Wiegand, "High Efficiency Video Coding (HEVC) text specification draft 7" JCTVC-I1003 d4, May 2012 (Geneva).

M. Haque, K. Sato, A. Tabatabai, T. Suzuki, "A simple ordering issue for VUI parameters syntax", JCTVC-J0273, July 2012 (Stockholm).

M. Haque, K. Sato, A. Tabatabai, T. Suzuki, "HEVC VUI Parameters with Extension Hooks", JCTVC-J0270, July 2012 (Stockholm).

M. Haque, A. Tabatabai, "Extension of HEVC VUI Syntax Structure", JCTVC-10263, May 2012.

M. Haque, "AHG10: VUI and HRD syntax designs agreed by the BoG on VPS and NUH", JCTVC-J0548r1, July 2012.

Figure 2:
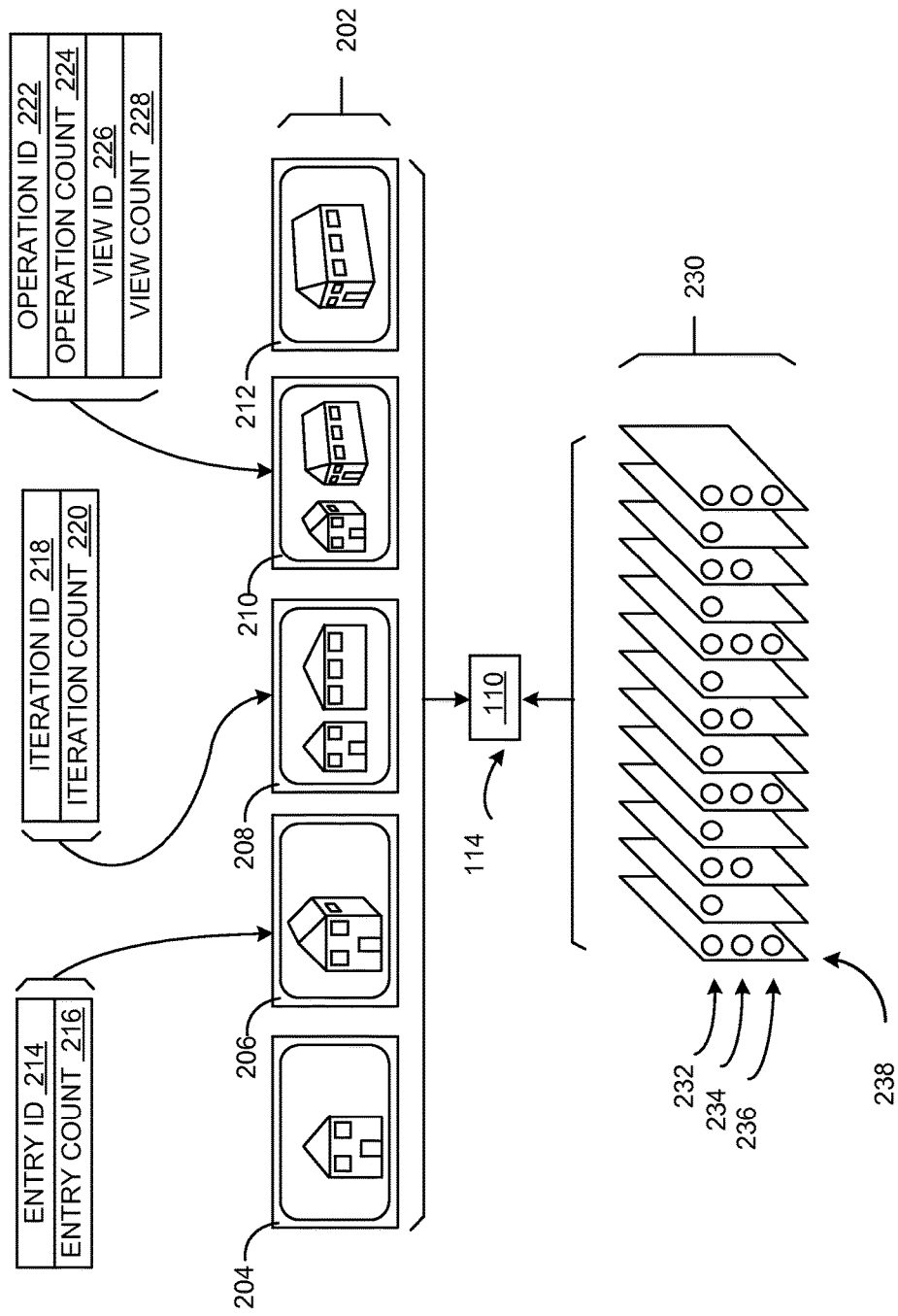
FIG. 2 is an example of the video bitstream.

Referring now to FIG. 2, therein is shown an example of the video bitstream 110. The video bitstream 110 includes an encoded occurrence of the video content 108 of FIG. 1 and can be decoded using the video syntax 114 to form the video stream 112 of FIG. 1 for display on the display interface 120 of FIG. 1.

The video bitstream 110 can include a variety of video types as indicated by a syntax type 202. The syntax type 202 is defined as an indicator of the type of video coding used to encode and decode the video bitstream 110. For example, the video content 108 can include the syntax type 202 for advanced video coding 204 (AVC), scalable video coding 206 (SVC), multiview video coding 208 (MVC), multiview video plus depth 210 (MVD), and stereoscopic video 212 (SSV).

The advanced video coding 204 and the scalable video coding 206 can be used to encode single view based video to form the video bitstream 110. The single view-based video can include the video content 108 generate from a single camera.

The multiview video coding 208, the multiview video plus depth 210, and the stereoscopic video 212 can be used to encode the video content 108 having two or more views. For example, multiview video can include the video content 108 from multiple cameras.

The video syntax 114 can include an entry count 216 for identifying the number of entries associated with each frame in the video content 108. The entry count 216 is the maximum number of entries represented in the video content 108.

The video syntax 114 can include an entry identifier 214. The entry identifier 214 is a value for differentiating between multiple coded video sequences. The coded video sequences can include occurrences of the video content 108 having a different bit-rate, frame-rate, resolution, or scalable layers for a single view video, multiview video, or stereoscopic video.

The video syntax 114 can include an iteration identifier 218. The iteration identifier 218 is a value to differentiate between individual iterations of the video content 108.

The video syntax 114 can include an iteration count 220. The iteration count 220 is a value indicating the maximum number of iterations of the video content 108.

For scalable video coding, the term iteration count can be used to indicate the number of information entries tied to different scalable video layers in the case of scalable video coding. For multiview video coding, the iteration count can be used to indicate the number of operation points tied to the number of views of the video content 108.

For example, in scalable video coding, the video content 108 can be encoded to include a base layer with additional enhancement layers to form multi-layer occurrences of the video bitstream 110. The base layer can have the lowest resolution, frame-rate, or quality.

The enhancement layers can include gradual refinements with additional left-over information used to increase the quality of the video. The scalable video layer extension can include a new baseline standard of HEVC that can be extended to cover scalable video coding.

The video syntax 114 can include an operation identifier 222. The operation identifier 222 is a value to differentiate between individual operation points of the video content 108. The operation points are information entries present for multiview video coding, such as timing information, network abstraction layer (NAL) hypothetical referenced decoder (HRD) parameters, video coding layer (VCL) HRD parameters, a pic_struct_present_flag element, or a combination thereof.

The video syntax 114 can include an operation count 224. The operation count 224 is a value indicating the maximum number of operations of the video content 108.

The operation points are tied to generation of coded video sequences from various views, such as views generated by different cameras, for multiview and 3D video. For multiview video coding, an operation point is associated with a subset of the video bitstream 110 having a target output view and the other views dependent on the target output view.

The other views are dependent on the target output view if they are derived using a sub-bitstream extraction process. More than one operation point may be associated with the same subset of the video bitstream 110. For example, decoding an operation point refers to the decoding of the subset of the video bitstream corresponding to the operation point and subsequent output of the target output views as a portion of the video stream 112 of FIG. 1 for display on the device video encoder.

The video syntax 114 can include a view identifier 226. The view identifier 226 is a value to differentiate between individual views of the video content 108.

The video syntax 114 can include a view count 228. The view count 228 is a value indicating the maximum number of views of the video content 108.

For example, a single view can be a video generated by a single camera. Multiview video can be generated by multiple cameras situated at different positions and distances from the objects being viewed in a scene.

The video content 108 can include a variety of video properties. For example, the video content 108 can be high resolution video, such as Ultra High Definition video. The video content 108 can have a pixel resolution greater than or equal to 3840 pixels by 2160 pixels or higher, including resolutions of 7680 by 4320, 8K by 2K, 4K by 2K, or a combination thereof. Although the video content 108 supports high resolution video, it is understood that the video content 108 can also support lower resolutions, such as high definition (HD) video. The video syntax 114 can support the resolution of the video content 108.

The video content 108 can support a variety of frame rates including 15 frames per second (fps), 24 fps, 25 fps, 30 fps, 50 fps, 60 fps, and 120 fps. Although individual frame rates are described, it is understood that the video content 108 can support fixed and variable frame rates of zero frames per second and higher. The video syntax 114 can support the frame rate of the video content 108.

The video bitstream 110 can include one or more temporal layers 230. The temporal layers 230 are defined as portions of the video bitstream 110 representing the video stream 112 at a specified frame rate. Each of the temporal layers 230 can represent the video stream 112 at a different frame rate expressed as frames per second (fps). The temporal layers 230 can form a hierarchy with higher layers including the lower layers.

For example, a first occurrence 232 of the temporal layers 230 can represent a 15 fps occurrence of the video stream 112, a second occurrence 234 of the temporal layers 230 can represent a 30 fps occurrence of the video stream 112, and a third occurrence 236 of the temporal layers 230 can represent a 60 fps occurrence of the video stream 112. The video bitstream 110 can have multiple occurrences of the temporal layers 230 as indicated by a temporal layer count 238. In a further example, the temporal layer count 238 can have a value of three for the first occurrence 232, the second occurrence 234, and the third occurrence 236.

The first occurrence 232 of the temporal layers 230 can represent a base layer that encodes the video content 108 to form the video stream 112 at 15 fps. The second occurrence 234 of the temporal layers 230 can represent the difference between the base layer, such as the first occurrence 232 of the temporal layers 230, and the video stream 112 of the video content 108 at 30 fps.

The second occurrence 234 can includes frames that represent the difference between the frames of the base layer and the new frames required for displaying the video content 108 at 30 fps. The third occurrence 236 of the temporal layers 230 can represent the difference between the second occurrence 234 of the temporal layers 230 and the video content at 60 fps.

In an illustrative example, the video decoder 102 of FIG. 1 for a smart phone can extract the second occurrence 234 of the temporal layers 230 at 30 fps from the video bitstream 110, which can include the information from the first occurrence 232 and the second occurrence 234. The information in the video bitstream 110 from the third occurrence 236 of the temporal layers 230 can be discarded to reduce the size of the video bitstream 110.

Referring now to FIG. 3, therein is shown an example of a HRD syntax 302. The HRD syntax 302 describes the parameters associated with the hypothetical reference decoder.

The HRD syntax 302 includes elements as described in the HRD base syntax table of FIG. 4. The elements of the HRD syntax 302 are arranged in a hierarchical structure as described in the HRD base syntax table of FIG. 4.

The HRD syntax 302 can be included in the video bitstream 110 of FIG. 1 and delivered in a time serial manner with each element received in the order it was sent. For example, the HRD syntax 302 can be received by the video decoder 104 of FIG. 1 as a serial bitstream having the elements of the HRD syntax 302 delivered in the order described in the HRD syntax table of FIG. 4.

The HRD syntax 302 can include a HRD syntax header 304, such as the hrd_parameters element. The HRD syntax header 304 is a descriptor for identifying the HRD syntax 302.

The HRD syntax 302 can include a coded picture buffer (CPB) count 308, such as a cpb_cnt_minus1 element. The CPB count 308 can indicate the number of alternative delivery schedules having restricted bit rates and CPB size values.

The HRD syntax 302 can include a bit rate scale 310, such as a bit_rate_scale element. The bit rate scale 310 specifies the maximum input bit rate of the CPB.

The HRD syntax 302 can include a CPB size scale 312, such as a cpb_size_scale element. The CPB size scale 312 is for determining the size of the coded picture buffer.

The HRD syntax 302 can include a loop structure to define a set of parameters for each occurrence of the coded picture buffer. The loop structure is dimensioned based on a schedule selection index 314, such as a SchedSelIdx element. The HRD syntax 302 loop structure can include a bit rate value 316, a CPB size value 318, and a constant bit rate (CBR) flag 320 for each occurrence of the coded picture buffer.

The HRD syntax 302 can include the bit rate value 316, such as a bit_rate_value_minus1 element. The bit rate value 316 can be used to specify the maximum input bit rate for each occurrence of the coded picture buffer.

The HRD syntax 302 can include the CPB size value 318, such as a cpb_size_value_minus1 element. The CPB size value 318 can be used to determine the size of each occurrence of the coded picture buffer.

The HRD syntax 302 can include the CBR flag 320, such as a cbr_flag element. The CBR flag 320 indicates the operation mode for decoding the video bitstream 110 for each occurrence of the coded picture buffer. If the CBR flag 320 has a value of 1, then the hypothetical stream delivery schedule (HSS) operates in a constant bit rate mode. Otherwise, the video bitstream 110 operates in an intermittent bit rate mode.

The HRD syntax 302 can include an initial CPB removal delay length 322, such as an initial_cpb_removal_delay_length_minus1 element. The initial CPB removal delay length 322 indicates the bit length of the elements initial_cpb_removal_delay and initial_cpb_removal_delay_offset of the buffering period supplemental enhancement information (SEI) message.

The HRD syntax 302 can include a CPB removal delay length 324, such as a cpb_removal_delay_length_minus1 element. The CPB removal delay length 324 can specify the bit length of the elements cpb_removal_delay in the picture timing SEI message.

The HRD syntax 302 can include a decoded picture buffer (DPB) output delay length 326, such as a dpb_output_delay_length_minus1 element. The DPB output delay length 326 indicates the size of the DPB.

The HRD syntax 302 can include a time offset length 328, such as a time_offset_length element. The time offset length 328 indicates the length in bits of the time_offset_element.

Referring now to FIG. 4, therein is shown an example of a High Efficiency Video Coding (HEVC) Video Usability Information (VUI) syntax 402. The HEVC VUI syntax 402 includes information about the video bitstream 110 of FIG. 1 to permit additional application usability features for the video content 108 of FIG. 1.

The HEVC VUI syntax 402 describes the elements in the HEVC VUI syntax table of FIG. 3. The elements of the HEVC VUI syntax 402 are arranged in a hierarchical structure as described in the HEVC VUI syntax table of FIG. 3.

The HEVC VUI syntax 402 includes a HEVC VUI syntax header 404, such as a vui_parameters element. The HEVC VUI syntax header 404 is a descriptor for identifying the HEVC VUI syntax 402. The HEVC VUI syntax 402 is used to encode and decode the video bitstream 110.

The HEVC VUI syntax 402 can include an aspect ratio flag 406, such as the aspect_ratio_info_present_flag element. The aspect ratio flag 406 can indicate that aspect ratio information is encoded in the video bitstream 110. The aspect ratio flag 406 can have a value 0 to indicate that aspect ratio information is not in the video bitstream 110 and a value of 1 to indicate that aspect ratio information is included in the video bitstream 110.

The HEVC VUI syntax 402 can include an aspect ratio indicator 408, such as the aspect_ratio_idc element. The aspect ratio indicator 408 is a value describing an aspect ratio of the video content 108 of FIG. 1. For example, the aspect ratio indicator 408, can include an index value for an enumerated list of predefined aspect ratios for the video content 108. In a further example, the aspect ratio indicator 408 can include a value indicating that the aspect ratio can be described by individual values for an aspect ratio width 410 and an aspect ratio height 412.

The HEVC VUI syntax 402 can include the aspect ratio width 410, such as the sar_width element, The aspect ratio width 410 can describe the width of the video content 108. The aspect ratio width 410 can describe the dimensions of the video content in ratios, pixels, lines, inches, centimeters, or a combination thereof.

The HEVC VUI syntax 402 can include the aspect ratio height 412, such as the sar_height element. The aspect ratio height 412 can describe the height of the video content 108. The aspect ratio height 412 can describe the dimensions of the video content in ratios, pixels, lines, inches, centimeters, or a combination thereof.

The HEVC VUI syntax 402 can include an overscan present flag 414, such as the overscan_info_present_flag. The overscan present flag 414 can indicate if overscan information is included in the video bitstream 110. The overscan present flag 414 can have a value of 1 to indicate that overscan information is present in the video bitstream or a value of 0 to indicate that overscan information is not present in the video bitstream 110.

Overscan is defined as display processes in which some parts near the borders of the cropped decoded pictures of the video stream 112 of FIG. 1 are not visible in the display area of the video stream 112. Underscan is defined as display processes in which the entire cropped decoded pictures of the video stream 112 are visible in the display area, but do not cover the entire display area.

The HEVC VUI syntax 402 can include an overscan appropriate flag 416, such as an overscan_appropriate_flag element. The overscan appropriate flag 416 can indicate that the video content 108 encoded in the video bitstream 110 can be displayed using overscan.

The overscan appropriate flag 416 can have a value of 1 to indicate that the cropped decoded pictures of the video stream 112 are suitable for display using overscan. The overscan appropriate flag 416 can have a value of zero to indicate that the cropped decoded pictures of the video stream 112 contain visually important information and should not be displayed using overscan.

The HEVC VUI syntax 402 can include a video signal present flag 418, such as the video_signal_type_present_flag element. The video signal present flag 418 can indicate that video signal type information is included in the video bitstream 110. The video signal present flag 418 can have a value of 1 to indicate that additional video signal type information is present in the video bitstream 110. The video signal present flag 418 can have a value of 0 to indicate that no video signal type information is present in the video bitstream 110.

The HEVC VUI syntax 402 can include a video format 420, such as the video_format element. The video format 420 can indicate the format of the video.

The HEVC VUI syntax 402 can include a video full range flag 422, such as the video_full_range_flag element. The video full range flag 422 can indicate the black level and the range of the luma and chroma signals for the video content 108 encoded in the video bitstream 110.

The HEVC VUI syntax 402 can include an color description present flag 424, such as the colour_description_present_flag element. The color description present flag 424 can indicate the presence of color description information in the video bitstream 110.

The color description present flag 424 can have a value of 0 to indicate that no other color description information is included in the video bitstream 110. The color description present flag 424 can have a value of 1 to indicate that a color primaries 426, a transfer characteristics 428, and a matrix coefficient 430 are included in the video bitstream 110.

The HEVC VUI syntax 402 can include the color primaries 426, such as the colour_primaries element. The color primaries 426 can indicate the color scheme used in the video content 108. For example, the color primaries 426 can indicate the chromaticity coordinates of the source primaries.

The HEVC VUI syntax 402 can include the transfer characteristics 428, such as the transfer_characteristics element. The transfer characteristics 428 can indicate the opto-electronic transfer characteristics of the video content 108. For example, the transfer characteristics 428 can be an enumerated value describing a predefined set of display characteristics.

The HEVC VUI syntax 402 can include the matrix coefficient 430, such as the matrix_coefficient element. The matrix coefficient 430 can indicate coefficient used to derive luma and chroma signals from the red, green, and blue primaries indicated by the color primaries 426. The matrix coefficient 430 can be used to computationally transform a set of red, blue, and green color coordinates to luma and chroma equivalents.

The HEVC VUI syntax 402 can include a chroma location information present flag 432, such as the chroma_loc_info_present_flag element. The chroma location information present flag 432 can have a value of 1 to indicate that a chroma top field sample 434 and a chroma bottom field sample 436 are present in the video bitstream 110.

The HEVC VUI syntax 402 can include the chroma top field sample 434, such as the chroma_sample_loc_type_top_field element. The chroma top field sample 434 is an enumerated value to specify the location of chroma samples for the top field in the video bitstream 110.

The HEVC VUI syntax 402 can include the chroma bottom field sample 436, such as the chroma_sample_loc_type_bottom_field element. The chroma bottom field sample 436 is an enumerated value to specify the location of chroma samples for the bottom field in the video bitstream 110.

The HEVC VUI syntax 402 can include a neutral chroma flag 438, such as the neutral_chroma_indication_flag element. The neutral chroma flag 438 can indicate whether the decoded chroma samples are equal to one. For example, if the neutral chroma flag 438 has a value of 1, then all of the decoded chroma samples are set to 1. If the neutral chroma flag 438 has a value of 0, then the decoded chroma samples are not limited to 1.

The HEVC VUI syntax 402 can include a field sequence flag 440, such as the field_seq_flag, can indicate whether coded video sequence information includes video representing fields. The field sequence flag 440 can have a value of 1 to indicate the coded video sequence of the video bitstream 110 includes field level pictures, and a value of 0 to indicate frame level pictures.

The HEVC VUI syntax 402 can include a timing information present flag 442, such as the timing_info_present_flag element. The timing information present flag 442 can indicate whether timing information is included in the video bitstream 110. For example, the timing information present flag 442 can have a value of 1 to indicate a tick units 444, a time scale 446, and a fixed picture rate flag 448 are present in the video bitstream 110.

The HEVC VUI syntax 402 can include the tick units 444, such as the num_unit_in_tick element. The tick units 444 can indicate the number of time units of a clock operating at the frequency of the time scale 446. For example, the tick units 444 can have corresponding to the minimum interval of time that can be represented in the video bitstream 110.

The HEVC VUI syntax 402 can include the time scale 446, such as the time_scale element. The time scale 446 is the number of time units that pass in one second.

The HEVC VUI syntax 402 can include the fixed picture rate flag 448, such as the fixed_pic_rate_flag element. The fixed picture rate flag 448 can indicate the whether the temporal distance between two consecutive pictures in the output order of the video stream 112 is constrained. The fixed picture rate flag 448 has a value of 0 to indicate that no constraint applies and a value of 1 to indicate that the temporal distance is constrained.

The HEVC VUI syntax 402 can include a NAL HRD parameters present flag 452, such as a nal_hrd_parameters_present_flag element. The NAL HRD parameters present flag 452 can indicate the presence of the NAL HRD parameters are included in the HRD syntax 302 of FIG. 3. The NAL HRD parameters present flag 452 can have a value of 1 to indicate that a HRD parameters structure 454 is present and a value of 0 to indicate the HRD parameters structure 454 is not present in the video bitstream 110.

The HEVC VUI syntax 402 can include the HRD parameters structure 454. The HRD parameters structure 454 is an occurrence of the HRD syntax 302 of FIG. 3. The HRD parameters structure 454 is described in detail in the HRD syntax section.

The HEVC VUI syntax 402 can include a VCL HRD parameters present flag 456, such as a vcl_hrd_parameters_present_flag element, can indicate the presence of the HRD information for VCL. The VCL HRD parameters present flag 456 can have a value of 1 to indicate that the HRD parameters structure 454 is present and a value of 0 to indicate the HRD parameters structure 454 is not present in the video bitstream 110.

If the NAL HRD parameters present flag 452 or the VCL HRD parameters present flag 456 have a value of 1, then the HEVC VUI syntax 402 can include a low delay flag 460 and a sub-picture CPB parameters present flag 462 in the video bitstream 110. If the sub-picture CPB parameters present flag 462 has a value of 1, then the HEVC VUI syntax 402 can include a subunit ticks 464 in the video bitstream 110.

The HEVC VUI syntax 402 can include the low delay flag 460, such as a low_delay_hrd_flag element. The low delay flag 460 can indicates the HRD operational mode.

The HEVC VUI syntax 402 can include the sub-picture CPB parameters present flag 462, such as a sub_pic_cpb_params_present_flag element. The sub-picture CPB parameters present flag 462 can indicate if sub-picture CPB parameters are present in the video bitstream 110.

The HEVC VUI syntax 402 can include the subunit ticks 464, such as a num_of_units_in_sub_tick element. The subunit ticks 464 can indicate the number of ticks to wait before removing timing supplemental enhancement information (SEI) messages.

The HEVC VUI syntax 402 can include a bitstream restriction flag 466, such as a bitstream_restriction_flag element. The bitstream restriction flag 466 can indicate that the coded video sequence bitstream restriction parameters are present in the video bitstream 110. If the bitstream restriction flag 466 has a value of 1 the HEVC VUI syntax 402 can include a tiles fixed structure flag 468, a motion vector flag 470, a max bytes per picture denomination 472, a maximum bits per minimum cu denomination 474, a maximum motion vector horizontal length 476, and a maximum motion vector vertical length 478.

The HEVC VUI syntax 402 can include the tiles fixed structure flag 468, such as a tiles_fixed_structure_flag element, can indicate that each picture in the coded video sequence has the same number of tiles. The tiles fixed structure flag 468 can have to value of 1 to indicate that fixed tiles and a value of 0 to indicate otherwise.

The HEVC VUI syntax 402 can include the motion vector flag 470, such as a motion_vector_over_pic_boundaries_flag element, can indicate that no sample outside the picture boundaries is used for prediction. If the motion vector flag 470 has a value of 1, then one or more samples outside the picture boundaries may be used for prediction, otherwise no samples are used for prediction.

The HEVC VUI syntax 402 can include the max bytes per picture denomination 472, such as a max_bytes_per_pic_denom element, is a value indicating the maximum number of bytes for the sum of the sizes of the VCL NAL units associated with any coded picture in the coded video sequence. If the max bytes per picture denomination 472 has a value of 0, then no limits are indicated. Otherwise, it is a requirement of bitstream conformance that no coded pictures shall be represented in the video bitstream 110 by more bytes than the max bytes per picture denomination 472.

The HEVC VUI syntax 402 can include the maximum bits per minimum cu denomination 474, such as a max_bits_per_min cu_denom element, is a value indicating the an upper bound for the number of coded bits of coding unit data for any coding block in any picture of the coded video sequence. If the maximum bits per minimum cu denomination 474 has a value of 0, then no limit is indicated. Otherwise, is a requirement of bitstream conformance that no coding unit shall be represented in the bitstream by more than the maximum bits per minimum cu denomination 474.

The HEVC VUI syntax 402 can include the maximum motion vector horizontal length 476, such as a log 2_max_mv_length_horizontal element, indicates the maximum absolute value of a decoded horizontal motion vector component for all pictures in the video bitstream 110. The maximum motion vector vertical length 478, such as a log 2_max_mv_length_vertical element, indicates the maximum absolute value of a decoded vertical motion vector component for all pictures in the video bitstream 110.

The HRD syntax 302 can represent a set of normative requirements for the video bitstream 110. The HRD syntax 302 can be used to control the bit rate of the video bitstream 110. For example, the HRD syntax 302 can include parameters for controlling variable or constant bit rate operations, low-delay behavior, and delay-tolerant behavior.

In another example, the HRD syntax 302 be used to control the coded picture buffer performance, the number of coded picture buffers, and the size of the coded picture buffers using parameters such as the bit rate scale 310 of FIG. 3, the CPB count 308 of FIG. 3, and the CPB size scale 312 of FIG. 3. The HRD syntax 302 can be used for controlling the decoded picture buffer using parameters such as the DPB output delay length 326 of FIG. 3.

It has been discovered that using the HRD syntax 302 provides improved performance by enabling finer grained control over the processing of the individual occurrences of the coded picture buffer. Using individual occurrences of the HRD syntax 302 can provide improved processing speed by taking advantage of individual differences between different occurrences of the CPB.

It has been discovered that encoding and decoding the video content 108 using the HRD syntax 302 can reduce the size of the video bitstream 110 and reduces the amount of video buffering required to display the video stream 112. Reducing the size of the video bitstream 110 increases functionality and increases the performance of display of the video stream 112.

Referring now to FIG. 5, therein is shown an example of a HEVC VUI extension syntax 502. The HEVC VUI extension syntax 502 provides information for each occurrence of the temporal layers in the video bitstream 110 of FIG. 1. The HEVC VUI extension syntax 502 can be an embodiment of the HEVC VUI syntax 402 of FIG. 4.

The HEVC VUI extension syntax 502 describes the elements in the HEVC VUI extension syntax table of FIG. 5. The elements of the HEVC VUI extension syntax 502 are arranged in a hierarchical structure as described in the HEVC VUI extension syntax table of FIG. 5.

The HEVC VUI syntax 402 can describe the VUI parameters of the video coding system 100 of FIG. 1. For example, the HEVC VUI extension syntax 502 can be an occurrence of the HEVC VUI syntax 402. Terms such as first or second are used for identification purposes only and do not indicate any order, priority, importance, or precedence.

The HEVC VUI extension syntax 502 includes a HEVC VUI extension syntax header 504, such as the vui_parameters element. The HEVC VUI extension syntax header 504 is a descriptor for identifying the HEVC VUI extension syntax 502.

The HEVC VUI extension syntax 502 can include the NAL HRD parameters present flag 452, such as the nal_hrd_parameters_present_flag element. The NAL HRD parameters present flag 452 can indicate the presence of the NAL HRD parameter information.

The HEVC VUI extension syntax 502 can include the VCL HRD parameters present flag 456, such as the vcl_hrd_parameters_present_flag element. The VCL HRD parameters present flag 456 can indicate the presence of the VCL HRD parameter information.

If the NAL HRD parameters present flag 452 or the VCL HRD parameters present flag 456 have a value of 1, then the HEVC VUI extension syntax 502 can include the low delay flag 460 and the sub-picture CPB parameters present flag 462.

The NAL HRD parameters present flag 452 and the VCL HRD parameters present flag 456 can control the inclusion of other HRD-related parameters. If the NAL HRD parameters present flag 452 or the VCL HRD parameters present flag 456 have a value of 1, then the HEVC VUI extension syntax 502 can include the low delay flag 460 and the sub-picture CPB parameters present flag 462.

The HEVC VUI extension syntax 502 can include the low delay flag 460, such as the low_delay_hrd_flag element. The low delay flag 460 can indicates the HRD operational mode.

The HEVC VUI extension syntax 502 can include the sub-picture CPB parameters present flag 462, such as the sub_pic_cpb_params_present_flag element. The sub-picture CPB parameters present flag 462 can indicate if sub-picture CPB parameters are present in the video bitstream 110 of FIG. 1.

If the sub-picture CPB parameters present flag 462 has a value of 1, then the HEVC VUI extension syntax 502 can include the subunit ticks 464, such as the num_of_units_in_sub_tick element. The subunit ticks 464 can indicate the number of ticks to wait before removing timing supplemental enhancement information (SEI) messages.

The HEVC VUI extension syntax 502 can include two conditional checks to be evaluated to determine if the HRD syntax 302 of FIG. 3 is included in the HEVC VUI extension syntax 502. If the NAL HRD parameters present flag 452 has a value of 1, then the HEVC VUI extension syntax 502 can include the HRD syntax 302.

If the VCL HRD parameters present flag 456 has a value of 1, then the HEVC VUI syntax 402 can include the HRD syntax 302. If neither the NAL HRD parameters present flag 452 or the VCL HRD parameters present flag 456 has a value of 1, then the HRD syntax 302 is not included in the HEVC VUI syntax 402.

The video bitstream 110 can include an occurrence of the HEVC VUI extension syntax 502. The video bitstream 110 is a serial bitstream with each element of the HEVC VUI extension syntax 502 ordered sequentially within the video bitstream 110. The elements of the HEVC VUI extension syntax 502 can be extracted from the video bitstream 110 in the order defined in the HEVC VUI extension syntax table of FIG. 5.

The value of the low delay flag 460 of the HEVC VUI extension syntax 502 can determine the usage of the CPB count 308 of FIG. 3 of the HRD syntax 302. If the low delay flag 460 has a value of 1, then the CPB count 308 is set to 0.

The HEVC VUI extension syntax 502 includes the low delay flag 460 positioned before the HRD syntax 302 in the serial transmission of the video bitstream 110. The low delay flag 460 is extracted before the HRD syntax 302. The NAL HRD parameters present flag 452 and VCL HRD parameters present flag 456 are extracted before the HRD syntax 302. The elements of the HRD syntax 302 can be extracted based on the value of the low delay flag 460, the NAL HRD parameters present flag 452, and the VCL HRD parameters present flag 456. For example, if the low delay flag 460 has a value of 1 and either the NAL HRD parameters present flag 452 or the VCL HRD parameters present flag 456 has a value of 1, then the value of the CPB count 308 of the HRD syntax 302 can be expressly set to 0 and the video coding system 100 can operating in a low delay mode with only a single coded picture buffer.

It has been discovered that encoding and decoding the video content 108 of FIG. 1 using the HEVC VUI extension syntax 502 having the HRD parameters structure 454 constant for all of the temporal layers 230 of FIG. 2 provides reduced complexity and increased performance. The HRD parameters structure 454 provides simplified performance and reduced complexity by enabling consistent control over the processing of the decoding process.

Referring now to FIG. 6, therein is shown an example of a HRD base syntax 602. The HRD base syntax 602 describes the parameters associated with the hypothetical reference decoder operation.

The HRD base syntax 602 includes elements as described in the HRD syntax table of FIG. 6. The elements of the HRD base syntax 602 are arranged in a hierarchical structure as described in the HRD syntax table of FIG. 6.

The HRD base syntax 602 can include a HRD base syntax header 604, such as the hrd_parameters element. The HRD base syntax header 604 is a descriptor for identifying the HRD base syntax 602.

The HRD base syntax 602 can include the timing information present flag 442, such as the timing_info_present_flag element, to indicate whether timing information is included in the video bitstream 110 of FIG. 1. The timing information present flag 442 can have a value of 1 to indicate timing information is in the video bitstream 110 and a value of 0 to indicate that timing information is not included in the video bitstream 110.

The HRD base syntax 602 can include the tick units 444, such as the num_units_in_tick element, to indicate the number of time units of a clock operating at the frequency of the time scale 446. For example, the tick units 444 can have corresponding to the minimum interval of time that can be represented in the video bitstream 110. The time scale 446, such as the time_scale element, is the number of time units that pass in one second.

The HRD base syntax 602 can include the NAL HRD parameters present flag 452, such as the nal_hrd_parameters_present_flag element, to indicate the presence of the NAL HRD parameter information. The HRD base syntax 602 can include the VCL HRD parameters present flag 456, such as the vcl_hrd_parameters_present_flag element, to indicate the presence of the HRD information for VCL.

If the NAL HRD parameters present flag 452 or the VCL HRD parameters present flag 456 has a value of 1, then the HRD base syntax 602 can include additional CPB-related elements. For example, the HRD base syntax 602 can include the sub-picture CPB parameters present flag 462, the bit rate scale 310, the CPB size scale 312, the initial CPB removal delay length 322, the CPB removal delay length 324, and the DPB output delay length 326.

The HRD base syntax 602 can include the sub-picture CPB parameters present flag 462, such as the sub_pic_cpb_params_present_flag element, to indicate if sub-picture CPB parameters are present in the video bitstream 110. If the sub-picture CPB parameters present flag 462 has a value of 1, then the HRD base syntax 602 can include a tick divisor 606, such as a tick_divisor_minus2 element, to specify the minimum interval of time that can be represented in the video bitstream 110.

The HRD base syntax 602 can include the bit rate scale 310, such as a bit_rate_scale element, to indicate the maximum input bit rate of coded picture buffer (CPB). The HRD base syntax 602 can include the CPB size scale 312, such as a cpb_size_scale element, for determining the size of the CPB.

The HRD base syntax 602 can include the initial CPB removal delay length 322, such as an initial_cpb_removal_delay_length_minus1 element, to indicate the bit length of the elements of the buffering period SEI message. The HRD base syntax 602 can include the CPB removal delay length 324, such as a cpb_removal_delay_length_minus1 element, to indicate the bit length of the elements cpb_removal_delay in the picture timing SEI message.

The HRD base syntax 602 can include the DPB output delay length 326, such as a dpb_output_delay_length_minus1 element. The DPB output delay length 326 indicates the size of the decoded picture buffer (DPB).

The HRD base syntax 602 can include a set of parameters for each occurrence of the sub-layers. The HRD base syntax 602 can include a loop structure using an iterator, such as [i], to describe parameters for each occurrence of the sub-layer.

The HRD base syntax 602 can include a sub-layer count 306, such as the MaxNumSubLayersMinus1 element, to indicate the maximum number of the sub-layers in the video bitstream 110. The HRD base syntax 602 can include the fixed picture rate flag 448, such as a fixed_pic_rate_flag element, to indicate whether the temporal distance between the HRD output times of any two consecutive pictures in the video bitstream 110 is constrained.

If the fixed picture rate flag 448 has a value of 1, then the HRD base syntax 602 can include a picture duration 608, such as a pic_duration_in_tc_minus1 element. The picture duration 608 can indicate the temporal distance between the HRD output times of any two consecutive pictures in output order in the coded video sequence.

The HRD base syntax 602 can include the low delay flag 460, such as a low_delay_hrd_flag element. The low delay flag 460 can indicate the HRD operational mode.

The HRD base syntax 602 can include the CPB count 308, such as a cpb_cnt_minus1 element. The CPB count 308 can indicate the number of alternative CPB specification in the video bitstream 110.

If the NAL HRD parameters present flag 452 has a value of 1, then the HRD base syntax 602 can include a HRD sub-layers parameters structure 610, such as a hrd_parameters_sub_layer element, for each occurrence of the sub-layers. The HRD sub-layers parameters structure 610 can describe the parameters related to each sub-layer.

If the VCL HRD parameters present flag 456 has a value of 1, then the HRD base syntax 602 can include the HRD sub-layers parameters structure 610, such as a hrd_parameters_sub_layer element, for each occurrence of the temporal layers 230 of FIG. 2. The HRD sub-layers parameters structure 610 can describe the parameters related to each sub-layer.

The HRD base syntax 602 includes the low delay flag 460 positioned before the HRD sub-layers parameters structure 610 in the serial transmission of the video bitstream 110. The low delay flag 460 is extracted before the HRD sub-layers parameters structure 610. The NAL HRD parameters present flag 452 and VCL HRD parameters present flag 456 are extracted before the HRD sub-layers parameters structure 610.

The elements of the HRD sub-layers parameters structure 610 can be extracted based on the value of the low delay flag 460, the NAL HRD parameters present flag 452, and the VCL HRD parameters present flag 456. For example, if the low delay flag 460 has a value of 1 and either the NAL HRD parameters present flag 452 or the VCL HRD parameters present flag 456 has a value of 1, then the value of the CPB count 308 of the HRD sub-layers parameters structure 610 can be expressly set to 0 and the video coding system 100 can operating in a low delay mode with only a single coded picture buffer.

It has been discovered that encoding and decoding the video content 108 of FIG. 1 using the HRD base syntax 602 can reduce the size of the video bitstream 110 and reduces the amount of video buffering required to display the video stream 112 of FIG. 1. Reducing the size of the video bitstream 110 increases functionality and increases the performance of display of the video stream 112.

Referring now to FIG. 7, therein is shown an example of a HRD sub-layer syntax 702. The HRD sub-layer syntax 702 describes the parameters associated with the sub-layers of the temporal layers for the hypothetical reference decoder.

The HRD sub-layer syntax 702 includes elements as described in the HRD sub-layer syntax table of FIG. 7. The elements of the HRD sub-layer syntax 702 are arranged in a hierarchical structure as described in the HRD sub-layer syntax table of FIG. 7.

The HRD sub-layer syntax 702 can include a HRD sub-layer syntax header 704, such as a HRD_parameters_sub_layer element. The HRD sub-layer syntax header 704 is a descriptor for identifying the HRD sub-layer syntax 702.

The HRD sub-layer syntax 702 can include a loop structure to define a set of parameters for each occurrence of the coded picture buffer. The loop structure is dimensioned based on the schedule selection index 314, such as a SchedSelIdx element.

The HRD sub-layer syntax 702 can include the bit rate value 316, such as a bit_rate_value_minus1 element. The bit rate value 316 can be used to specify the maximum input bit rate for each occurrence of the coded picture buffer.

The HRD sub-layer syntax 702 can include the CPB size value 318, such as a cpb_size_value_minus1 element. The CPB size value 318 can be used to determine the size of each occurrence of the coded picture buffer.

The HRD sub-layer syntax 702 can include the CBR flag 320, such as a cbr_flag element. The CBR flag 320 indicates the operation mode for decoding the video bitstream 110 of FIG. 1 for each occurrence of the coded picture buffer. If the CBR flag 320 has a value of 1, then the hypothetical stream delivery schedule operates in a constant bit rate mode. Otherwise, the video bitstream 110 includes an intermittent bit rate mode.

The HRD sub-layer syntax 702 can describe properties of the temporal layers 230 of FIG. 2. The temporal layers 230 can also be designated as sub-layers of the video bitstream 110 of FIG. 1.

The HRD sub-layer syntax 702 can represent the sub-layers or the temporal layers 230 of the video bitstream 110. The HRD sub-layer syntax 702 can be used to select one of the sub-layers or one of the temporal layers 230 and allow the removal occurrences of other sub-layers from the video bitstream 110.

Removing occurrences of the sub-layers or the temporal layers 230 can reduce the overall volume of data within the video bitstream 110 and enable bit-rate reduction or resizing of the video content 108 of FIG. 1 for better transmission, improved storage bandwidth control and adjustment. Providing sub-layer or temporal layer specific HRD parameters enable better and smoother bitstream decoding to generate the video stream 112 of FIG. 1.

It has been discovered that using the HRD sub-layer syntax 702 provides improved performance by enabling finer grained control over the processing of the individual sub-layers associated with the temporal layers 230 of FIG. 2. Using individual occurrences of the HRD sub-layer syntax 702 can provide improved processing speed by taking advantage of individual differences between different sub-layers.

Referring now to FIG. 8, therein is shown an example of a HRD VUI syntax 802. The HRD VUI syntax 802 describes the parameters associated with the hypothetical reference decoder.

The HRD VUI syntax 802 includes elements as described in the HRD VUI syntax table of FIG. 8. The elements of the HRD VUI syntax 802 are arranged in a hierarchical structure as described in the HRD VUI syntax table of FIG. 8.

The HRD VUI syntax 802 can include a HRD VUI syntax header 804, such as the vui_parameters element. The HRD VUI syntax header 804 is a descriptor for identifying the HRD VUI syntax 802.

The HRD VUI syntax 802 can include the aspect ratio flag 406, such as the aspect_ratio_info_present_flag element, to show that additional aspect ratio information is encoded in the video bitstream 110 of FIG. 1. The HRD VUI syntax 802 can include the aspect ratio indicator 408, such as the aspect_ratio_idc element, to describe the aspect ratio of the video content 108 of FIG. 1.

The aspect ratio indicator 408 can include a value indicating that the aspect ratio can be described by individual values for the aspect ratio width 410 and the aspect ratio height 412. The aspect ratio width 410, such as the sar_width element, can describe the width of the video content 108. The aspect ratio height 412, such as the sar_height element, can describe the height of the video content 108.

The HRD VUI syntax 802 can include the overscan present flag 414, such as the overscan_info_present_flag element, to indicate if overscan information is included in the video bitstream 110. If the overscan present flag 414 has a value of 1, then the HRD VUI syntax 802 can include the overscan appropriate flag 416, such as an overscan_appropriate_flag element, to indicate that the video content 108 encoded in the video bitstream 110 can be displayed using overscan.

The HRD VUI syntax 802 can include the video signal present flag 418, such as the video_signal_type_present_flag element, to indicate that video signal type information is included in the video bitstream 110. If the video signal present flag 418 has a value of 1, the HRD VUI syntax 802 can include the video format 420, the video full range flag 422, and the color description present flag 424.

The video format 420, such as the video_format element, can indicate the format of the video. The video full range flag 422, such as the video_full_range_flag element, can indicate the black level and the range of the luma and chroma signals for the video content 108 encoded in the video bitstream 110.

The color description present flag 424, such as the colour_description_present_flag element, can indicate the presence of color description information in the video bitstream 110. The color description information can include the color primaries 426, the transfer characteristics 428, and the matrix coefficient 430.

The color primaries 426, such as the colour_primaries element, can indicate the color scheme used in the video content 108. The transfer characteristics 428 can indicate the opto-electronic transfer characteristics of the video content 108. The matrix coefficient 430, such as the matrix_coefficient element, can indicate coefficient used to derive luma and chroma signals from the red, green, and blue primaries indicated by the color primaries 426.

The HRD VUI syntax 802 can include the chroma location information present flag 432, such as the chroma_loc_info_present_flag element, to indicate whether additional chroma information is present in the video bitstream 110. If the chroma location information present flag 432 can has a value of 1, then the HRD VUI syntax 802 can include the chroma top field sample 434 and the chroma bottom field sample 436.

The chroma top field sample 434, such as the chroma_sample_loc_type_top_field element, can be an enumerated value to specify the location of chroma samples for the top field in the video bitstream 110. The chroma bottom field sample 436, such as the chroma_sample_loc_type_bottom_field element, can be an enumerated value to specify the location of chroma samples for the bottom field in the video bitstream 110.

The HRD VUI syntax 802 can include the neutral chroma flag 438, such as the neutral_chroma_indication_flag element, can indicate whether the decoded chroma samples are equal to one. The HRD VUI syntax 802 can include the field sequence flag 440, such as the field_seq_flag, to indicate whether coded video sequence information includes video representing fields.

The HRD VUI syntax 802 can include the HRD parameters structure 454, such as the hrd_parameters element. The HRD parameters structure 454 can include the hypothetical reference decoder parameters for each sub-layer.

The HRD VUI syntax 802 can include the bitstream restriction flag 466, such as a bitstream_restriction_flag element, to indicate that the coded video sequence bitstream restriction parameters are present in the video bitstream 110. If the bitstream restriction flag 466 has a value of 1 the HRD VUI syntax 802 can include the tiles fixed structure flag 468, the motion vector flag 470, the max bytes per picture denomination 472, the maximum bits per minimum cu denomination 474, the maximum motion vector horizontal length 476, and the maximum motion vector vertical length 478.

The HRD VUI syntax 802 can include the tiles fixed structure flag 468, such as a tiles_fixed_structure_flag element, to indicate that each picture in the coded video sequence has the same number of tiles. The HRD VUI syntax 802 can include the motion vector flag 470, such as a motion_vector_over_pic_boundaries_flag element, to indicate that no sample outside the picture boundaries is used for prediction.

The HRD VUI syntax 802 can include the max bytes per picture denomination 472, such as a max_bytes_per_pic_denom element, to indicate the maximum number of bytes for the sum of the sizes of the VCL NAL units associated with any coded picture in the coded video sequence. The HRD VUI syntax 802 can include the maximum bits per minimum cu denomination 474, such as a max_bits_per_min_cu_denom element, to indicate the upper bound for the number of coded bits of coding unit data for any coding block in any picture of the coded video sequence.

The HRD VUI syntax 802 can include the maximum motion vector horizontal length 476, such as a log 2_max_mv_length_horizontal element, to indicate the maximum absolute value of a decoded horizontal motion vector component for all pictures in the video bitstream 110. The HRD VUI syntax 802 can include the maximum motion vector vertical length 478, such as a log 2_max_mv_length_vertical element, to indicate the maximum absolute value of a decoded vertical motion vector component for all pictures in the video bitstream 110.

It has been discovered that using the HRD parameters structure 454 in the HRD VUI syntax 802 provides improved performance by enabling finer grained control over the processing of the individual sub-layers. Using individual occurrences of the HRD parameters structure 454 can provide improved processing speed by taking advantage of individual differences between different sub-layers.

Figure 9:
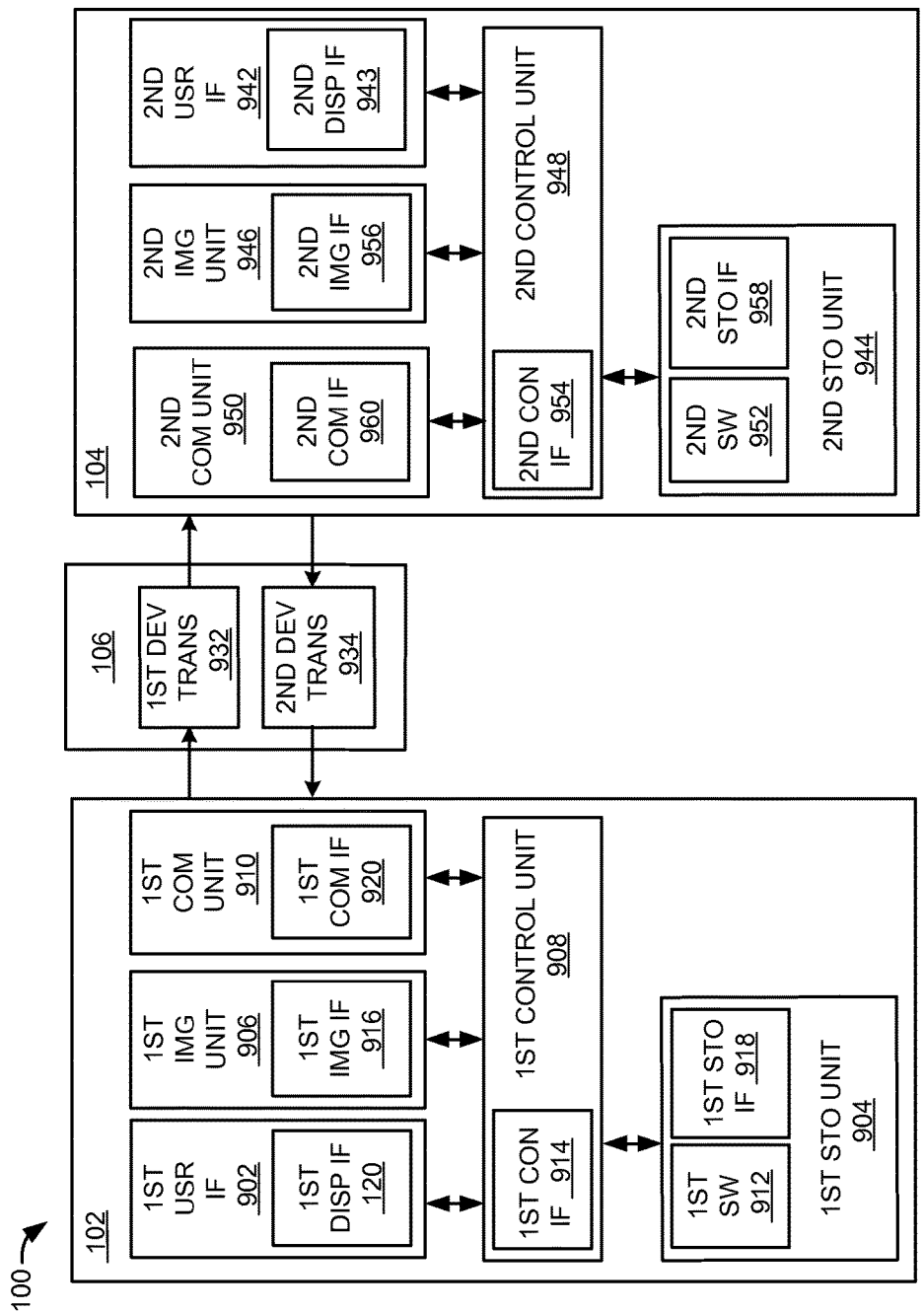
FIG. 9 is a functional block diagram of the video coding system.

Referring now to FIG. 9, therein is shown a functional block diagram of the video coding system 100. The video coding system 100 can include the first device 102, the second device 104 and the communication path 106.

The first device 102 can communicate with the second device 104 over the communication path 106. The first device 102 can send information in a first device transmission 932 over the communication path 106 to the second device 104. The second device 104 can send information in a second device transmission 934 over the communication path 106 to the first device 102.

For illustrative purposes, the video coding system 100 is shown with the first device 102 as a client device, although it is understood that the video coding system 100 can have the first device 102 as a different type of device. For example, the first device can be a server. In a further example, the first device 102 can be the video encoder 102, the video decoder 104, or a combination thereof.

Also for illustrative purposes, the video coding system 100 is shown with the second device 104 as a server, although it is understood that the video coding system 100 can have the second device 104 as a different type of device. For example, the second device 104 can be a client device. In a further example, the second device 104 can be the video encoder 102, the video decoder 104, or a combination thereof.

For brevity of description in this embodiment of the present invention, the first device 102 will be described as a client device, such as a video camera, smart phone, or a combination thereof. The present invention is not limited to this selection for the type of devices. The selection is an example of the present invention.

The first device 102 can include a first control unit 908. The first control unit 908 can include a first control interface 914. The first control unit 908 can execute a first software 912 to provide the intelligence of the video coding system 100.

The first control unit 908 can be implemented in a number of different manners. For example, the first control unit 908 can be a processor, an embedded processor, a microprocessor, a hardware control logic, a hardware finite state machine (FSM), a digital signal processor (DSP), or a combination thereof.

The first control interface 914 can be used for communication between the first control unit 908 and other functional units in the first device 102. The first control interface 914 can also be used for communication that is external to the first device 102.

The first control interface 914 can receive information from the other functional units or from external sources, or can transmit information to the other functional units or to external destinations. The external sources and the external destinations refer to sources and destinations external to the first device 102.

The first control interface 914 can be implemented in different ways and can include different implementations depending on which functional units or external units are being interfaced with the first control interface 914. For example, the first control interface 914 can be implemented with electrical circuitry, microelectromechanical systems (MEMS), optical circuitry, wireless circuitry, wireline circuitry, or a combination thereof.

The first device 102 can include a first storage unit 904. The first storage unit 904 can store the first software 912. The first storage unit 904 can also store the relevant information, such as images, syntax information, video, maps, profiles, display preferences, sensor data, or any combination thereof.

The first storage unit 904 can be a volatile memory, a nonvolatile memory, an internal memory, an external memory, or a combination thereof. For example, the first storage unit 904 can be a nonvolatile storage such as non-volatile random access memory (NVRAM), Flash memory, disk storage, or a volatile storage such as static random access memory (SRAM).

The first storage unit 904 can include a first storage interface 918. The first storage interface 918 can be used for communication between the first storage unit 904 and other functional units in the first device 102. The first storage interface 918 can also be used for communication that is external to the first device 102.

The first device 102 can include a first imaging unit 906. The first imaging unit 906 can capture the video content 108 of FIG. 1 from the real world. The first imaging unit 906 can include a digital camera, an video camera, an optical sensor, or any combination thereof.

The first imaging unit 906 can include a first imaging interface 916. The first imaging interface 916 can be used for communication between the first imaging unit 906 and other functional units in the first device 102.

The first imaging interface 916 can receive information from the other functional units or from external sources, or can transmit information to the other functional units or to external destinations. The external sources and the external destinations refer to sources and destinations external to the first device 102.

The first imaging interface 916 can include different implementations depending on which functional units or external units are being interfaced with the first imaging unit 906. The first imaging interface 916 can be implemented with technologies and techniques similar to the implementation of the first control interface 914.

The first storage interface 918 can receive information from the other functional units or from external sources, or can transmit information to the other functional units or to external destinations. The external sources and the external destinations refer to sources and destinations external to the first device 102.

The first storage interface 918 can include different implementations depending on which functional units or external units are being interfaced with the first storage unit 904. The first storage interface 918 can be implemented with technologies and techniques similar to the implementation of the first control interface 914.

The first device 102 can include a first communication unit 910. The first communication unit 910 can be for enabling external communication to and from the first device 102. For example, the first communication unit 910 can permit the first device 102 to communicate with the second device 104, an attachment, such as a peripheral device or a computer desktop, and the communication path 106.

The first communication unit 910 can also function as a communication hub allowing the first device 102 to function as part of the communication path 106 and not limited to be an end point or terminal unit to the communication path 106. The first communication unit 910 can include active and passive components, such as microelectronics or an antenna, for interaction with the communication path 106.

The first communication unit 910 can include a first communication interface 920. The first communication interface 920 can be used for communication between the first communication unit 910 and other functional units in the first device 102. The first communication interface 920 can receive information from the other functional units or can transmit information to the other functional units.

The first communication interface 920 can include different implementations depending on which functional units are being interfaced with the first communication unit 910. The first communication interface 920 can be implemented with technologies and techniques similar to the implementation of the first control interface 914.

The first device 102 can include a first user interface 902. The first user interface 902 allows a user (not shown) to interface and interact with the first device 102. The first user interface 902 can include a first user input (not shown). The first user input can include touch screen, gestures, motion detection, buttons, sliders, knobs, virtual buttons, voice recognition controls, or any combination thereof.

The first user interface 902 can include the first display interface 120. The first display interface 120 can allow the user to interact with the first user interface 902. The first display interface 120 can include a display, a video screen, a speaker, or any combination thereof.

The first control unit 908 can operate with the first user interface 902 to display video information generated by the video coding system 100 on the first display interface 120. The first control unit 908 can also execute the first software 912 for the other functions of the video coding system 100, including receiving video information from the first storage unit 904 for display on the first display interface 120. The first control unit 908 can further execute the first software 912 for interaction with the communication path 106 via the first communication unit 910.

For illustrative purposes, the first device 102 can be partitioned having the first user interface 902, the first storage unit 904, the first control unit 908, and the first communication unit 910, although it is understood that the first device 102 can have a different partition. For example, the first software 912 can be partitioned differently such that some or all of its function can be in the first control unit 908 and the first communication unit 910. Also, the first device 102 can include other functional units not shown in FIG. 1 for clarity.

The video coding system 100 can include the second device 104. The second device 104 can be optimized for implementing the present invention in a multiple device embodiment with the first device 102. The second device 104 can provide the additional or higher performance processing power compared to the first device 102.

The second device 104 can include a second control unit 948. The second control unit 948 can include a second control interface 954. The second control unit 948 can execute a second software 952 to provide the intelligence of the video coding system 100.

The second control unit 948 can be implemented in a number of different manners. For example, the second control unit 948 can be a processor, an embedded processor, a microprocessor, a hardware control logic, a hardware finite state machine (FSM), a digital signal processor (DSP), or a combination thereof.

The second control interface 954 can be used for communication between the second control unit 948 and other functional units in the second device 104. The second control interface 954 can also be used for communication that is external to the second device 104.

The second control interface 954 can receive information from the other functional units or from external sources, or can transmit information to the other functional units or to external destinations. The external sources and the external destinations refer to sources and destinations external to the second device 104.

The second control interface 954 can be implemented in different ways and can include different implementations depending on which functional units or external units are being interfaced with the second control interface 954. For example, the second control interface 954 can be implemented with electrical circuitry, microelectromechanical systems (MEMS), optical circuitry, wireless circuitry, wireline circuitry, or a combination thereof.

The second device 104 can include a second storage unit 944. The second storage unit 944 can store the second software 952. The second storage unit 944 can also store the relevant information, such as images, syntax information, video, maps, profiles, display preferences, sensor data, or any combination thereof.

The second storage unit 944 can be a volatile memory, a nonvolatile memory, an internal memory, an external memory, or a combination thereof. For example, the second storage unit 944 can be a nonvolatile storage such as non-volatile random access memory (NVRAM), Flash memory, disk storage, or a volatile storage such as static random access memory (SRAM).

The second storage unit 944 can include a second storage interface 958. The second storage interface 958 can be used for communication between the second storage unit 944 and other functional units in the second device 104. The second storage interface 958 can also be used for communication that is external to the second device 104.

The second storage interface 958 can receive information from the other functional units or from external sources, or can transmit information to the other functional units or to external destinations. The external sources and the external destinations refer to sources and destinations external to the second device 104.

The second storage interface 958 can include different implementations depending on which functional units or external units are being interfaced with the second storage unit 944. The second storage interface 958 can be implemented with technologies and techniques similar to the implementation of the second control interface 954.

The second device 104 can include a second imaging unit 946. The second imaging unit 946 can capture the video content 108 from the real world. The first imaging unit 906 can include a digital camera, an video camera, an optical sensor, or any combination thereof.

The second imaging unit 946 can include a second imaging interface 956. The second imaging interface 956 can be used for communication between the second imaging unit 946 and other functional units in the second device 104.

The second imaging interface 956 can receive information from the other functional units or from external sources, or can transmit information to the other functional units or to external destinations. The external sources and the external destinations refer to sources and destinations external to the second device 104.

The second imaging interface 956 can include different implementations depending on which functional units or external units are being interfaced with the second imaging unit 946. The second imaging interface 956 can be implemented with technologies and techniques similar to the implementation of the first control interface 914.

The second device 104 can include a second communication unit 950. The second communication unit 950 can enable external communication to and from the second device 104. For example, the second communication unit 950 can permit the second device 104 to communicate with the first device 102, an attachment, such as a peripheral device or a computer desktop, and the communication path 106.

The second communication unit 950 can also function as a communication hub allowing the second device 104 to function as part of the communication path 106 and not limited to be an end point or terminal unit to the communication path 106. The second communication unit 950 can include active and passive components, such as microelectronics or an antenna, for interaction with the communication path 106.

The second communication unit 950 can include a second communication interface 960. The second communication interface 960 can be used for communication between the second communication unit 950 and other functional units in the second device 104. The second communication interface 960 can receive information from the other functional units or can transmit information to the other functional units.

The second communication interface 960 can include different implementations depending on which functional units are being interfaced with the second communication unit 950. The second communication interface 960 can be implemented with technologies and techniques similar to the implementation of the second control interface 954.

The second device 104 can include a second user interface 942. The second user interface 942 allows a user (not shown) to interface and interact with the second device 104. The second user interface 942 can include a second user input (not shown). The second user input can include touch screen, gestures, motion detection, buttons, sliders, knobs, virtual buttons, voice recognition controls, or any combination thereof.

The second user interface 942 can include a second display interface 943. The second display interface 943 can allow the user to interact with the second user interface 942. The second display interface 943 can include a display, a video screen, a speaker, or any combination thereof.

The second control unit 948 can operate with the second user interface 942 to display information generated by the video coding system 100 on the second display interface 943. The second control unit 948 can also execute the second software 952 for the other functions of the video coding system 100, including receiving display information from the second storage unit 944 for display on the second display interface 943. The second control unit 948 can further execute the second software 952 for interaction with the communication path 106 via the second communication unit 950.

For illustrative purposes, the second device 104 can be partitioned having the second user interface 942, the second storage unit 944, the second control unit 948, and the second communication unit 950, although it is understood that the second device 104 can have a different partition. For example, the second software 952 can be partitioned differently such that some or all of its function can be in the second control unit 948 and the second communication unit 950. Also, the second device 104 can include other functional units not shown in FIG. 1 for clarity.

The first communication unit 910 can couple with the communication path 106 to send information to the second device 104 in the first device transmission 932. The second device 104 can receive information in the second communication unit 950 from the first device transmission 932 of the communication path 106.

The second communication unit 950 can couple with the communication path 106 to send video information to the first device 102 in the second device transmission 934. The first device 102 can receive video information in the first communication unit 910 from the second device transmission 934 of the communication path 106. The video coding system 100 can be executed by the first control unit 908, the second control unit 948, or a combination thereof.

The functional units in the first device 102 can work individually and independently of the other functional units. For illustrative purposes, the video coding system 100 is described by operation of the first device 102. It is understood that the first device 102 can operate any of the modules and functions of the video coding system 100. For example, the first device 102 can be described to operate the first control unit 908.

The functional units in the second device 104 can work individually and independently of the other functional units. For illustrative purposes, the video coding system 100 can be described by operation of the second device 104. It is understood that the second device 104 can operate any of the modules and functions of the video coding system 100. For example, the second device 104 is described to operate the second control unit 948.

For illustrative purposes, the video coding system 100 is described by operation of the first device 102 and the second device 104. It is understood that the first device 102 and the second device 104 can operate any of the modules and functions of the video coding system 100. For example, the first device 102 is described to operate the first control unit 908, although it is understood that the second device 104 can also operate the first control unit 908.

Figure 10:
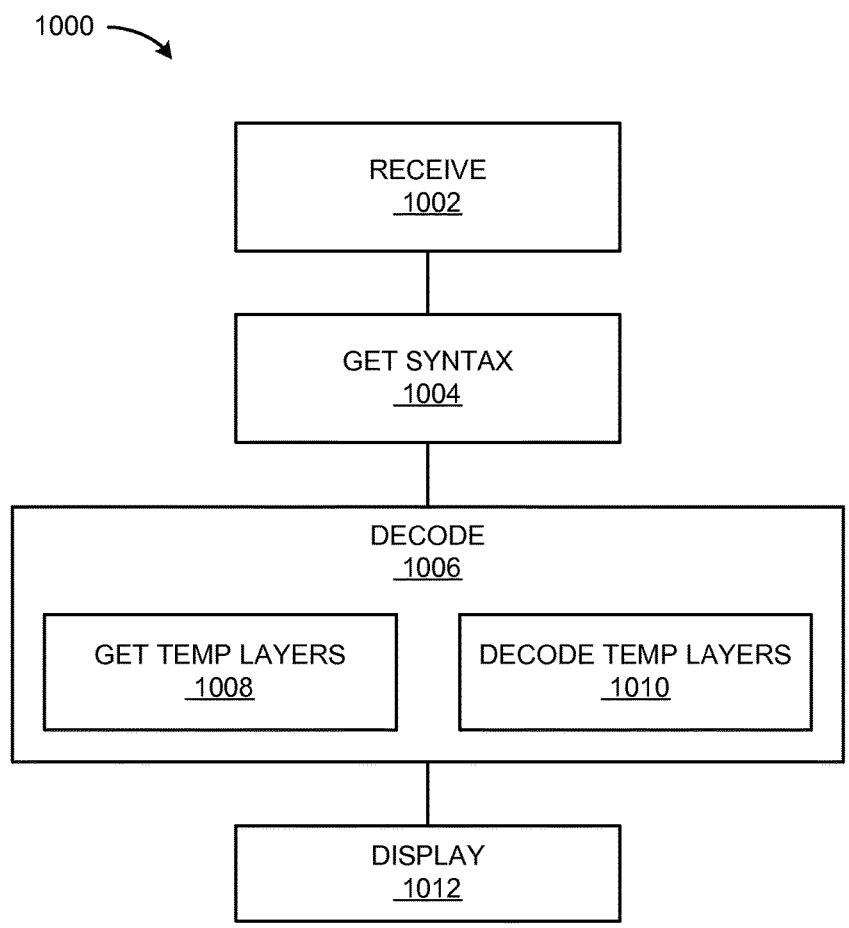
FIG. 10 is a control flow of the video coding system.

Referring now to FIG. 10, therein is shown a control flow 1000 of the video coding system 100 of FIG. 1. The control flow 1000 describes decoding the video bitstream 110 of FIG. 1 by receiving the video bitstream 110, extracting the video syntax 114 of FIG. 1, decoding the video bitstream 110, and displaying the video stream 112 of FIG. 1.

The video coding system 100 can include a receive module 1002. The receive module 1002 can receive the video bitstream 110 encoded by the video encoder 102 of FIG. 1.

The video bitstream 110 can be received in a variety of ways. For example, the video bitstream 110 can be received from the video encoder 102 of FIG. 1 as a streaming serial bitstream, a pre-encoded video file (not shown), in a digital message (not shown) over the communication path 106 of FIG. 1, or a combination thereof.

In an illustrative example, the video bitstream 110 can be received as a serial bitstream in a timewise manner with each element of the video syntax 114 received sequentially. The video bitstream 110 can include the video syntax 114 such as the HEVC VUI syntax 402 of FIG. 4, the HEVC VUI extension syntax 502 of FIG. 5, the HRD VUI syntax 802 of FIG. 8, the HRD syntax 302 of FIG. 3, the HRD base syntax 602 of FIG. 6, the HRD sub-layer syntax 702 of FIG. 7, or a combination thereof.

For example, the receive module 1002 can receive the HEVC VUI syntax 402 with the HRD parameters structure 454 of FIG. 4 received before the low delay flag 460 of FIG. 4. Similarly, the NAL HRD parameters present flag 452 of FIG. 4 can be received before the HRD parameters structure 454. If the NAL HRD parameters present flag 452 has a value of 0, then the VCL HRD parameters present flag 456 of FIG. 4 can be received before the HRD parameters structure 454.

The video bitstream 110 can include one or more the temporal layers 230 of FIG. 2 for representing the video content 108 of FIG. 1 at different frame rates. The receive module 1002 can selectively filter the temporal layers 230 to reduce the size of the video bitstream 110.

For example, the receive module 1002 can receive the video bitstream 110 having the temporal layers 230 for three different frame rates, such as 60 fps, 30 fps, and 15 fps. The receive module 1002 can filter the video bitstream 110 to remove the 60 fps and the 30 fps occurrences of the temporal layers 230 and only process the 15 fps occurrence of the temporal layers 230.

The video coding system 100 can include a get syntax module 1004. The get syntax module 1004 can identify and extract the video syntax 114 of the video bitstream 110. The get syntax module 1004 can include a get temporal layers module 1008 and a decode temporal layers module 1010.

The get syntax module 1004 can extract the video syntax 114 for the video bitstream 110 in a variety of ways. For example, the get syntax module 1004 can extract the video syntax 114 by searching the video bitstream 110 for headers indicating the presence of the video syntax 114. In another example, the video syntax 114 can be extracted from the video bitstream 110 using a demultiplexer (not shown) to separate the video syntax 114 from the video image data of the video bitstream 110.

In yet another example, the video syntax 114 can be extracted from the video bitstream 110 by extracting a sequence parameter set Raw Byte Sequence Payload (RBSP) syntax. The sequence parameter set RBSP is a syntax structure containing an integer number of bytes encapsulated in a network abstraction layer unit. The RBSP can be either empty or have the form of a string of data bits containing syntax elements followed by a RBSP stop bit and followed by zero or more addition bits equal to 0.

The video syntax 114 can be extracted from a serial bitstream in a timewise manner by extracting individual elements as the elements are available in time order in the video bitstream 110. The video coding system 100 can selectively extract and process later elements based on the values of the earlier extracted elements.

For example, the get syntax module 1004 can process the HRD syntax 302 based on the previously received value of the low delay flag 460. The HEVC VUI extension syntax 502 includes the low delay flag 460 positioned before the HRD syntax 302 in the serial transmission of the video bitstream 110. The low delay flag 460 is extracted before the HRD syntax 302. The NAL HRD parameters present flag 452 and VCL HRD parameters present flag 456 are extracted before the HRD syntax 302.

The elements of the HRD syntax 302 can be extracted based on the value of the low delay flag 460, the NAL HRD parameters present flag 452, and the VCL HRD parameters present flag 456. For example, if the low delay flag 460 has a value of 1 and either the NAL HRD parameters present flag 452 or the VCL HRD parameters present flag 456 has a value of 1, then the value of the CPB count 308 of the HRD syntax 302 can be extracted and expressly set to 0 by the get syntax module 1004 and the video coding system 100 can operating in a low delay mode with a single coded picture buffer.

In another example, if the video bitstream 110 is received in a file, then the video syntax 114 can be detected by examining the file extension of the file containing the video bitstream 110. In yet another example, if the video bitstream 110 is received as a digital message over the communication path 106 of FIG. 1, then the video syntax 114 can be provided as a portion of the structure of the digital message.

It has been discovered that the get syntax module 1004 can increase performance by dynamically decoding the video bitstream 110 to process the HRD parameters structure 454 based on previously extracted occurrences of the low delay flag 460. For example, receiving the low delay flag 460 increases decoding performance by changing the level of delay allowed in the coded picture buffers when applying the HRD parameters structure 454.

The get syntax module 1004 can extract the individual elements of the video syntax 114 based on the syntax type 202 of FIG. 2. The syntax type 202 can include AVC video, SVC video, MVC video, MVD video, SSV video, or a combination thereof.

The get syntax module 1004 can extract the video syntax 114 having video usability information. The video syntax 114 can include the HEVC VUI syntax 402, the HEVC VUI extension syntax 502, the HRD VUI syntax 802, or a combination thereof.

The get syntax module 1004 can extract the video syntax 114 having hypothetical reference decoder information. The video syntax 114 can include the HRD syntax 302, the HRD base syntax 602, the HRD sub-layer syntax 702, or a combination thereof.

The video syntax 114 can have a variety of configurations. For example, the HEVC VUI syntax 402 can include one occurrence of the HRD syntax 302 for all occurrences of the temporal layers 230. In another example, the get syntax module 1004 can include one occurrence of the HRD syntax 302 for each occurrence of the temporal layers 230.

In an illustrative example, the HRD syntax 302 can include single occurrences of the CPB count 308, the bit rate scale 310 of FIG. 3, the CPB size scale 312 of FIG. 3, initial CPB removal delay length 322 of FIG. 3, the CPB removal delay length 324 of FIG. 3, the DPB output delay length 326 of FIG. 3, and the time offset length 328 of FIG. 3. The HRD syntax 302 can include a loop structure with occurrences for each of the bit rate value 316 of FIG. 3, the CPB size value 318 of FIG. 3, and the CBR flag 320 of FIG. 3 for each of the coded picture buffers as indicated by the CPB count 308.

The video coding system 100 can include a decode module 1006. The decode module 1006 can decode the video bitstream 110 using the video syntax 114 to form the video stream 112. The decode module 1006 can include a get temporal layers module 1008 and a decode temporal layers module 1010.

The decode module 1006 can decode the video bitstream 110 using the video syntax 114, such as the HEVC VUI syntax 402, the HEVC VUI extension syntax, the HRD VUI syntax 802, or a combination thereof. The decode module 1006 can identify and extract the temporal layers 230 using the HRD syntax 302, the HRD base syntax 602, the HRD sub-layer syntax 702, or a combination thereof.

The get temporal layers module 1008 can identify the temporal layers 230 to extract from the video bitstream 110 to form the video stream 112. The get temporal layers module 1008 can identify the temporal layers 230 in a variety of ways.

For example, the get temporal layers module 1008 can identify the temporal layers 230 by extracting the temporal layer count 238 of FIG. 2 from the video syntax 114, such as HEVC VUI extension syntax. The temporal layer count 238 indicates the total number of temporal layers 230 in the video bitstream 110.

The get temporal layers module 1008 can extract the temporal layers 230 from the video bitstream 110 using the video syntax 114 to describe the data type and size of the elements of the video syntax 114. The video syntax 114 can include the hypothetical reference decoder parameters syntaxes, such as the HRD syntax 302, the HRD base syntax 602, the HRD sub-layers syntax 702, or a combination thereof.

For example, the get temporal layers module 1008 can extract the aspect ratio flag 406 of FIG. 4 as an unsigned 1 bit value in the video bitstream 110. Similarly, the aspect ratio height 412 of FIG. 4 and the aspect ratio width 410 of FIG. 4 can be extracted from the video bitstream 110 as unsigned 16 bit values as described in the HEVC VUI syntax 402.

The get temporal layers module 1008 can extract the temporal layers 230 by parsing the data in the video bitstream 110 based on the video syntax 114. The video syntax 114 can define the number and configuration of the temporal layers 230.

For example, the get temporal layers module 1008 can use the temporal layer count 238 to determine the total number of the temporal layers 230 to extract from the video bitstream 110. The video format 420 of FIG. 4 can be extracted from the video bitstream 110 to determine the type of video system of the video content 108.

In another example, the CPB count 308 can be used to determine the number of coded picture buffers to be used to extract the temporal layers 230. The bit rate scale 310 can be used to determine the maximum input bit rate for the coded picture buffers. The CPB size scale 312 can be used to determine the size of the coded picture buffers.

In an illustrative example, the get temporal layers module 1008 can extract the first occurrence 232 of FIG. 2 and the second occurrence 234 of FIG. 2 of the temporal layers 230 from the video bitstream 110 based on the HRD syntax 302. The HRD syntax 302 can be common for all of the temporal layers 230 in the video bitstream 110.

The decode temporal layers module 1010 can receive the temporal layers 230 from the get temporal layers module 1008 and decode the temporal layers 230 to form the video stream 112. The decode temporal layers module 1010 can decode the temporal layers 230 in a variety of ways.

For example, the decode temporal layers module 1010 can decode the temporal layers 230 using the HRD base syntax 602 to extract the video coding layer information from the video bitstream 110. In another example, the decode temporal layers module 1010 can decode the temporal layers 230 using the HRD sub-layer syntax 702. The decode temporal layers module 1010 can decode the temporal layers 230 and select one of the temporal layers 230 to form the video stream 112.

The video coding system 100 can include a display module 1012. The display module 1012 can receive the video stream 112 from the decode module 1006 and display the video stream 112 on the display interface 120 of FIG. 1. The video stream 112 can include one or more occurrences of the temporal layers 230

The physical transformation from the optical images of physical objects of the video content 108 to displaying the video stream 112 on the pixel elements of the display interface 120 of FIG. 1 results in physical changes to the pixel elements of the display interface 120 in the physical world, such as the change of electrical state the pixel element, is based on the operation of the video coding system 100. As the changes in the physical world occurs, such as the motion of the objects captured in the video content 108, the movement itself creates additional information, such as the updates to the video content 108, that are converted back into changes in the pixel elements of the display interface 120 for continued operation of the video coding system 100.

The first software 912 of FIG. 9 of the first device 102 can include the video coding system 100. For example, the first software 912 can include the receive module 1002, the get syntax module 1004, the decode module 1006, and the display module 1012.

The first control unit 908 of FIG. 9 can execute the first software 912 for the receive module 1002 to receive the video bitstream 110. The first control unit 908 can execute the first software 912 for the get syntax module 1004 to identify and extract the video syntax 114 from the video bitstream 110. The first control unit 908 can execute the first software 912 for the decode module 1006 to form the video stream 112. The first control unit 908 can execute the first software 912 for the display module 1012 to display the video stream 112.

The second software 952 of FIG. 9 of the second device 104 of FIG. 1 can include the video coding system 100. For example, the second software 952 can include the receive module 1002, the get syntax module 1004, and the decode module 1006.

The second control unit 948 of FIG. 9 can execute the second software 952 for the receive module 1002 to receive the video bitstream 110. The second control unit 948 can execute the second software 952 for the get syntax module 1004 to identify and extract the video syntax 114 from the video bitstream 110. The second control unit 948 can execute the second software 952 for the decode module 1006 to form the video stream 112 of FIG. 1. The second control unit 948 can execute the second software for the display module 1012 to display the video stream 112.

The video coding system 100 can be partitioned between the first software 912 and the second software 952. For example, the second software 952 can include the decode module 1006, and the display module 1012. The second control unit 948 can execute modules partitioned on the second software 952 as previously described.

In an illustrative example, the video coding system 100 can include the video encoder 102 on the first device 102 and the video decoder 104 on the second device 104. The video decoder 104 can include the display processor 118 of FIG. 1 and the display interface 120.

The first software 912 can include the receive module 1002 and the get syntax module 1004. Depending on the size of the first storage unit 904 of FIG. 9, the first software 912 can include additional modules of the video coding system 100. The first control unit 908 can execute the modules partitioned on the first software 912 as previously described.

The first control unit 908 can operate the first communication unit 910 of FIG. 9 to send the video bitstream 110 to the second device 104. The first control unit 908 can operate the first software 912 to operate the first imaging unit 906 of FIG. 9. The second communication unit 950 of FIG. 9 can send the video stream 112 to the first device 102 over the communication path 106.

The video coding system 100 describes the module functions or order as an example. The modules can be partitioned differently. For example, the get syntax module 1004 and the decode module 1006 can be combined. Each of the modules can operate individually and independently of the other modules.

Furthermore, data generated in one module can be used by another module without being directly coupled to each other. For example, the decode module 1006 can receive the video bitstream 110 from the receive module 1002.

The modules can be implemented in a variety of ways. The receive module 1002, the get syntax module 1004, the decode module 1006, and the display module 1012 can be implemented in as hardware accelerators (not shown) within the first control unit 908 or the second control unit 948, or can be implemented in as hardware accelerators (not shown) in the first device 102 or the second device 104 outside of the first control unit 908 or the second control unit 948.

Figure 11:
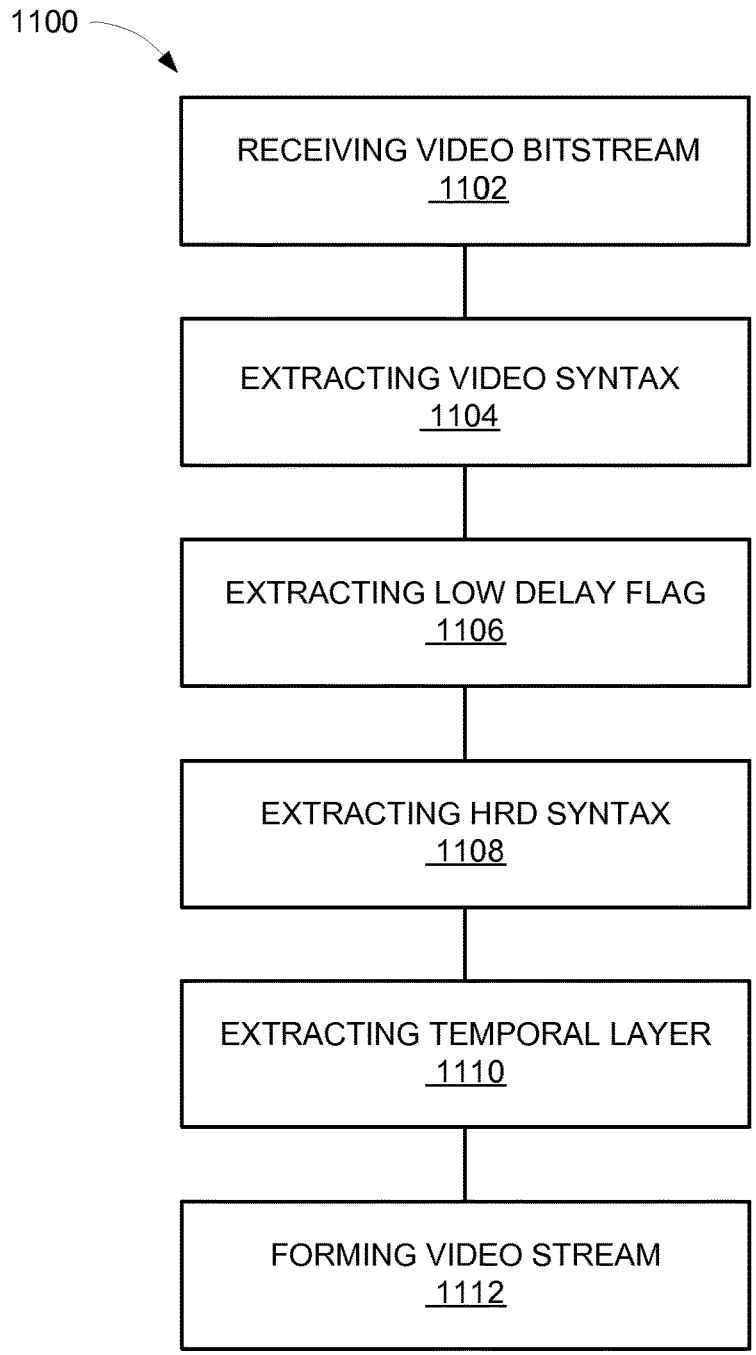
FIG. 11 is a flow chart of a method of operation of the video coding system in a further embodiment of the present invention.

Referring now to FIG. 11, therein is shown a flow chart of a method 1100 of operation of the video coding system in a further embodiment of the present invention. The method 1100 includes: receiving a video bitstream as a serial bitstream in a block 1102; extracting a video syntax from the video bitstream; extracting a low delay flag, a network abstraction layer (NAL) hypothetical reference decode (HRD) parameters present flag, and a video coding layer (VCL) HRD parameters present flag from the video syntax extracting a HRD syntax from the video bitstream based on the low delay flag, the NAL HRD parameters present flag, and the VCL HRD parameters present flag in a block 1104; extracting a temporal layer from the video bitstream based on the video syntax having the HRD syntax in a block 1106; and forming a video stream based on the temporal layer for displaying on a device in a block 1108.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the video coding system of the present invention furnishes important and heretofore unknown and unavailable solutions, capabilities, and functional aspects for efficiently coding and decoding video content for high definition applications. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A decoding method, comprising:
   extracting, from an encoded bit stream, a hypothetical reference decoder (HRD) syntax, wherein the HRD syntax comprises a fixed picture rate flag which indicates whether temporal distance between HRD output times of two consecutive pictures in the encoded bit stream is constrained, a low delay flag, a network abstraction layer (NAL) hypothetical reference decode (HRD) parameters present flag, and a video coding layer (VCL) HRD parameters present flag;

extracting a first sub-layer of a plurality of sub-layers from the encoded bit stream based on the extracted hypothetical reference decoder (HRD) syntax, wherein the first sub-layer of the plurality of sub-layers represents the encoded bit stream at a first frame rate different from a second frame rate which is indicated by a second sub-layer of the plurality of sub-layers; and decoding the encoded bit stream based on the extracted first sub-layer, wherein the HRD syntax further comprises a coded picture buffer (CPB) count which indicates a number of delivery schedules of the encoded bit stream and a size of the CPB.

2. The decoding method as claimed in claim 1, wherein the extraction of the hypothetical reference decoder (HRD) syntax further includes a picture duration element based on a value of the fixed picture rate flag that is 1.

3. A video decoding system, comprising:
at least one processor configured to:
extract, from an encoded bit stream, a hypothetical reference decoder (HRD) syntax that includes a fixed picture rate flag that indicates whether temporal distance between HRD output times of two consecutive pictures in the encoded bit stream is constrained, a low delay flag, a network abstraction layer (NAL) hypothetical reference decode (HRD) parameters present flag, and a video coding layer (VCL) HRD parameters present flag;

extract a first sub-layer of a plurality of sub-layers from the encoded bit stream based on the extracted hypothetical reference decoder (HRD) syntax, wherein the first sub-layer of the plurality of sub-layers represents the encoded bit stream at a first frame rate different from a second frame rate which is indicated by a second sub-layer of the plurality of sub-layers; and decode the encoded bit stream based on the extracted first sub-layer, wherein the HRD syntax further comprises a coded picture buffer (CPB) count which indicates a number of delivery schedules of the encoded bit stream and a size of the CPB.

4. The video decoding system as claimed in claim 3, wherein the hypothetical reference decoder (HRD) syntax further includes a picture duration element based on a value of the fixed picture rate flag that is 1.

5. The decoding method as claimed in claim 1, wherein the extracted hypothetical reference decoder (HRD) syntax further includes a duration element, which is pic_duration_in_tc_minus1 that indicates the temporal distance between the HRD output times of two consecutive pictures in output order in video sequence of the encoded bit stream.

6. The decoding method as claimed in claim 1, extracting of the low delay flag prior to extraction of a HRD sub-layers parameters structure.

* * * * *